(12) United States Patent
McKennoch et al.

(10) Patent No.: US 10,600,192 B1
(45) Date of Patent: Mar. 24, 2020

(54) MULTI-CAMERA HOMOGENEOUS OBJECT ALIGNMENT

(71) Applicant: Vulcan Inc., Seattle, WA (US)

(72) Inventors: Samuel Allan McKennoch, Seattle, WA (US); Cecil Lee Quartey, Seattle, WA (US); Jeremy Kyle Bensley, Whitesboro, TX (US)

(73) Assignee: Vulcan Inc., Seattle, WA (US)

(*) Notice: Subject to any disclaimer, the term of this patent is extended or adjusted under 35 U.S.C. 154(b) by 122 days.

(21) Appl. No.: 15/979,193

(22) Filed: May 14, 2018

(51) Int. Cl.
*G06T 9/00* (2006.01)
*G06T 7/292* (2017.01)

(52) U.S. Cl.
CPC .... *G06T 7/292* (2017.01); *G06T 2207/10016* (2013.01); *G06T 2207/30241* (2013.01)

(58) Field of Classification Search
CPC ..... G06T 7/292; G06T 7/0081; G06T 7/0083; G06T 2207/20144; G06T 2207/10016; G06T 2207/30176; G06K 9/38; G06K 9/202; G06K 9/4638; G06K 9/48; G06K 9/222; G06K 9/481
See application file for complete search history.

(56) References Cited

U.S. PATENT DOCUMENTS

| | | | | |
|---|---|---|---|---|
| 5,748,199 A | * | 5/1998 | Palm | H04N 13/133 345/473 |
| 5,793,372 A | * | 8/1998 | Binns | G06T 15/04 345/419 |
| 9,443,130 B2 | * | 9/2016 | Ukil | G06K 9/00208 |
| 9,530,240 B2 | * | 12/2016 | Wang | G06T 7/12 |
| 9,807,313 B2 | * | 10/2017 | Wu | H04N 5/247 |
| 10,349,033 B2 | * | 7/2019 | Doh | G06T 7/579 |
| 10,401,716 B2 | * | 9/2019 | Edwards | G06T 7/521 |
| 2018/0211401 A1 | * | 7/2018 | Lee | G06T 7/593 |
| 2019/0020861 A1 | * | 1/2019 | Leonard | H04N 13/111 |

* cited by examiner

*Primary Examiner* — Amir Alavi
(74) *Attorney, Agent, or Firm* — Davis Wright Tremaine LLP

(57) ABSTRACT

A first digital representation in an image and a second digital representation in a second image is identified based at least in part on specified criteria. A first epipolar line in the second image is determined based at least in part on a position of the first digital representation in the image. A second epipolar line is determined based at least in part on a position of the second digital representation in the second image. At least one cost value is determined based at least in part on the first digital representation, the second digital representation, the first epipolar line, and the second epipolar line. The first digital representation and the second digital representation are determined, based at least in part on the at least one cost value, to represent a same object. The first digital representation is associated in a data store with the second digital representation.

20 Claims, 13 Drawing Sheets

MULTI-CAMERA HOMOGENEOUS OBJECT ALIGNMENT

CROSS REFERENCE TO RELATED APPLICATION

This application incorporates by reference for all purposes the full disclosure of co-pending U.S. patent application Ser. No. 15/979,210, filed concurrently herewith, entitled "MULTI-CAMERA HOMOGENEOUS OBJECT TRAJECTORY ALIGNMENT".

BACKGROUND

In an image frame of a video recording, it can be difficult for a computing device to distinguish one object in the image frame from another object in the image frame, particularly when the objects are relatively homogenous in size and shape. It is even more challenging for computing devices to identify which of the homogenous objects in the scene of a video recorded by one video camera correspond to homogenous objects in another video simultaneously recorded by another video camera from a different perspective. The difficulty is exacerbated if the objects are animate and changing in position and orientation between image frames of the videos. Tracking the separate trajectories of homogenous objects in the videos presents another challenge, as the homogeneity of the objects makes it difficult for a computing device to determine which object is associated with which trajectory (particularly if the objects cross paths, are near to each other, or enter or exit from outside the field of view of the video cameras).

BRIEF DESCRIPTION OF THE DRAWINGS

Various techniques will be described with reference to the drawings, in which.

DETAILED DESCRIPTION

Figure 1:
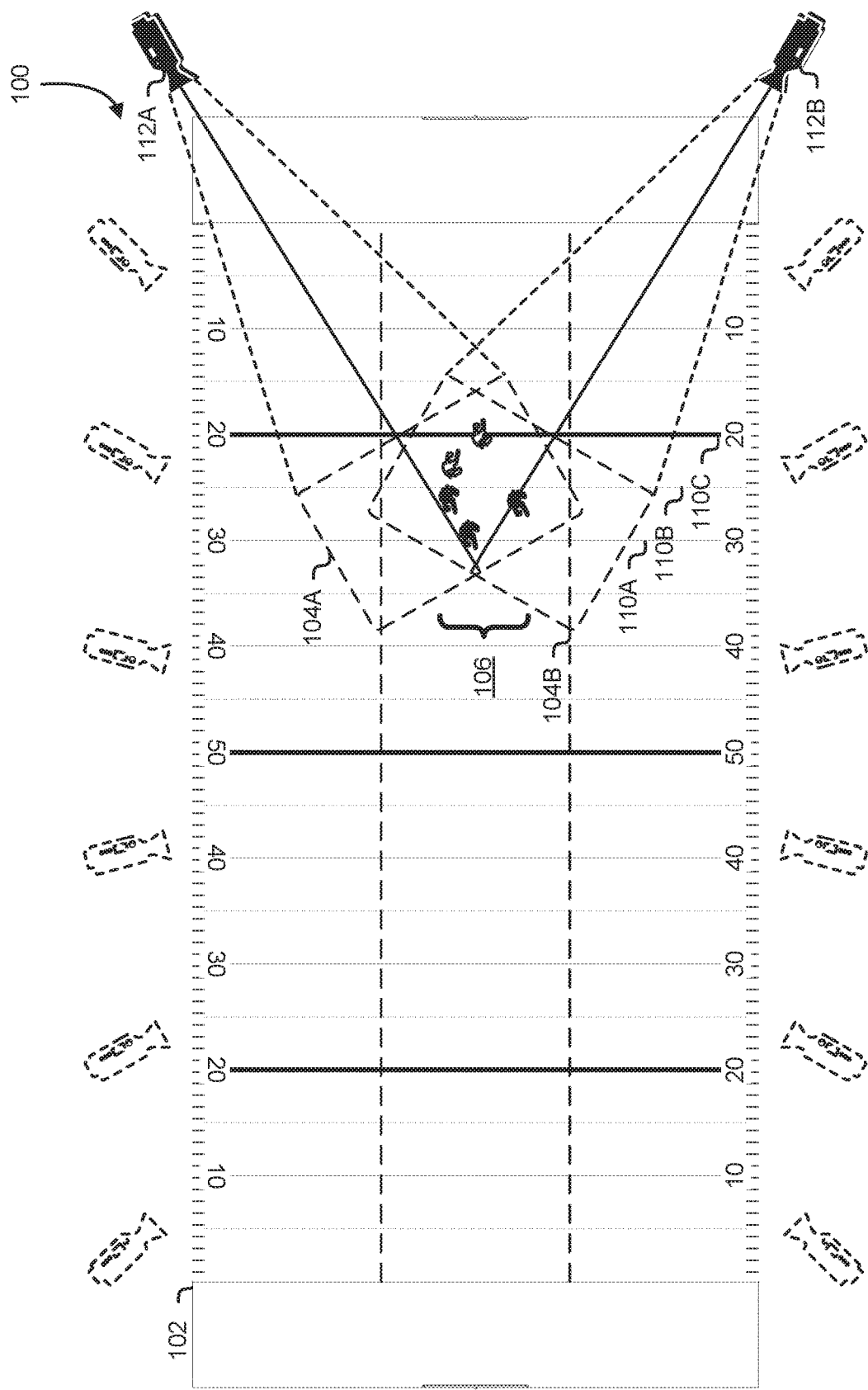
FIG. 1 illustrates an example of multi-camera image capture of a shared scene in accordance with an embodiment.

Techniques and systems described below relate to multi-camera object alignment and object trajectory alignment. In one example, a first image and a second image is obtained via a plurality of image capture devices sharing different perspective views of a common scene. A first point corresponding to an object identified in the first image is determined. A line in the second image corresponding to the first point in the first image is determined based at least in part on the first point and relative positions of the plurality of image capture devices. A second point corresponding to a first set of pixels and a third point corresponding to a second set of pixels is determined in the second image. A first distance from the second point to the line and a second distance from the third point to the line is determined. A set of cost values is calculated based at least in part on the first distance and the second distance. Based at least in part on the set of cost values, that the first set of pixels is determined to represent, in the second image, the object identified in the first image, and the first set of pixels is associated with the object.

In another example, a sequence of images recorded by an image capture device is obtained, with the sequence including a first image and a second image and with the first image including a first representation of an object. A position of the first representation in the first image is determined. A predicted position for a representation of the object in the second image is generated at least in part by providing the position as input to a prediction algorithm. The second representation is identified, based at least in part on a distance between the predicted position and a second representation, as representing the object in the second image. A trajectory between the position of the first representation and a position of the second representation is generated. A request for a state of the object at a moment in time captured by the image capture device is received. Based at least in part on the trajectory and the moment in time, the state of the object at the moment is determined, and the state of the object is provided in response to the request.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of computing, especially the field of digital object kinematics, by tracking the motion of objects in a three-dimensional space depicted in a sequence of two-dimensional images. Additionally, techniques described and suggested in the present disclosure improve the efficiency of digital object identification and matching by using an algorithm that efficiently estimates a likely match between objects in two images captured from different perspectives. Moreover, techniques described and suggested in the present disclosure are necessarily rooted in computer technology in order to overcome problems specifically arising with the problem of matching and distinguishing homogenous objects in digital images.

FIG. 1 illustrates an example embodiment 100 of the present disclosure. Specifically, FIG. 1 depicts a physical environment 102 containing a plurality of objects 106 being visually recorded by a series of recording devices 112, each having a field of view 104 of the physical environment 102.

When two cameras, such as the recording devices 112A-12B, view a scene in the physical environment 102 from two distinct positions, epipolar geometry may be utilized to match an object in the image captured by the first recording device 112A to its corresponding object in the image captured by the second recording device 112B. In various embodiments, the term "match" does not necessarily indicate equality. That is, two objects in separate images may be said to match if they correspond to a common object or satisfy one or more matching criteria. Likewise, two trajectories of objects in separate sequences of images may match if they correspond to the same object or satisfy one or more matching criteria. Generally any way of determining a match may be utilized.

In some embodiments, in an initial stage, points of reference in the background are determined. For example, the physical environment 102 depicts a sports field with various parallel lines. As can be seen, parallel lines 110A-10C pass through both fields of view of the recording devices 112A-12B. The real-world coordinates for the parallel lines 110A-10C may be determined, and, likewise, the picture element (pixel) coordinates corresponding to the parallel lines 110A-10C in the captured images may be determined.

The parallel lines 110A-10C may be used to determine epipolar lines between an image captured by the first recording device 112A and the second recording device 112B. A pair of cost matrices (one for each of the pair of images captured by the first recording device 112A and the second recording device 112B) comprising distances (e.g., in pixels) of detected objects to the epipolar lines.

The physical environment 102 may be a real (e.g., non-virtual) location, at least a portion of which is being recorded as a sequence of images by one or more image capture devices (e.g., the recording devices 112). For example, FIG. 1 depicts a sports field as one example of the physical environment 102. However, FIG. 1 is intended to be illustrative only, and it is contemplated that techniques of the present disclosure may be used in other types of physical environments, such as in areas under surveillance by security cameras, roads and/or other areas being recorded by image sensors on an automobile, etc.

The fields of view 104A-04B may be the extent of the physical environment 102 that is captured by the respective recording devices 112A-12B. The fields of view 104A-04B may be solid angles (e.g., two-dimensional angles in three-dimensional space that an object subtends at a point) through which elements (e.g., pixel sensors) of the recording devices 112A-12B are sensitive to electromagnetic radiation at any one time.

The objects 106 may be a plurality of objects that are within the fields of view 104A-04B, at least a subset of which are captured (i.e., within a shared view) by both recording devices 112A-12B. In some embodiments, the objects 106 are individuals, such as members of sports teams in the physical environment 102. However, it is also contemplated that techniques of the present disclosure are applicable with objects 106 that are either animate or inanimate, and/or include one or more of a living (e.g., animal, plant, etc.) or non-living entity (e.g., boulder, automobile, building, etc.).

In some implementations, the objects 106 have certain visual characteristics (e.g., shape, color, pattern, etc.) usable by systems of the present disclosure to distinguish the objects 106 from the background of the physical environment 102 and/or from objects that are not of interest in the particular application of these techniques. For example, in one implementation the system identifies occurrences of "football helmets" in images captured by the recording devices 112A-12B as being the objects 106 of interest (football helmets having characteristics of being of particular shape and/or color); in this manner, background objects (e.g., the football, goal posts, hash marks, referees, spectators, etc.) incidentally captured in images captured by the recording devices 112A-12B may be excluded from the objects 106 of interest identified by the system.

In some applications, the objects are generally homogeneous. In some examples, the term "homogenous" refers to uniformity (e.g., size, color, or shape) within an image such that one object of the objects is not consistently visually identifiable from another of the objects. Within an image, the object may be represented by a set of pixels, with the size of the set of pixels being affected both by the distance of the image capture device from the object as well as the resolution of the image. For example, during an American football game players of a particular team wear helmets of the same size, shape, and color combination, and a set of pixels representing the helmet of one player may not include sufficient distinguishing characteristics to distinguish it from a set of pixels representing the helmet of another player. An object may be considered homogenous even if it includes certain distinguishing visible characteristics if such the object is not distinguishable (and therefore be considered homogenous) from other of the objects due to the positions and orientations of the objects. For example, players of a particular sports team may wear uniform with the same colors and/or patterns as other players, but may have numbers and/or names printed on the uniform for identification purposes; however, in any given image, an identifying mark may be obscured or turned away from the image capture devices such that the identity of the object (e.g., player) is uncertain.

The recording devices 112A-12B may be may be devices for electronic motion picture acquisition or electronic still picture acquisition. In embodiments, the recording devices 112A-12B include an image sensor (e.g., charge-coupled device (CCD) or complementary metal-oxide-semiconductor (CMOS)), memory, image processing capability, and/or a microphone. The recording devices 112A-12B may be designed to record and/or communicate a digital or analog stream of media (e.g., audio, video, text, or any combination of audio, video, or text) in a manner such that the media can be replayed or reproduced on a device designed to display such media. Examples of such recording devices include a digital video camera, a web camera, mobile telephone, and so on. In embodiments, the video capture device 112A-12B is stationary. However, it is contemplated that certain techniques of the present disclosure may be applied to non-stationary recording devices. For example, a non-stationary recording device may follow an object in motion (e.g., keeping the object within its field of view).

Figure 2:
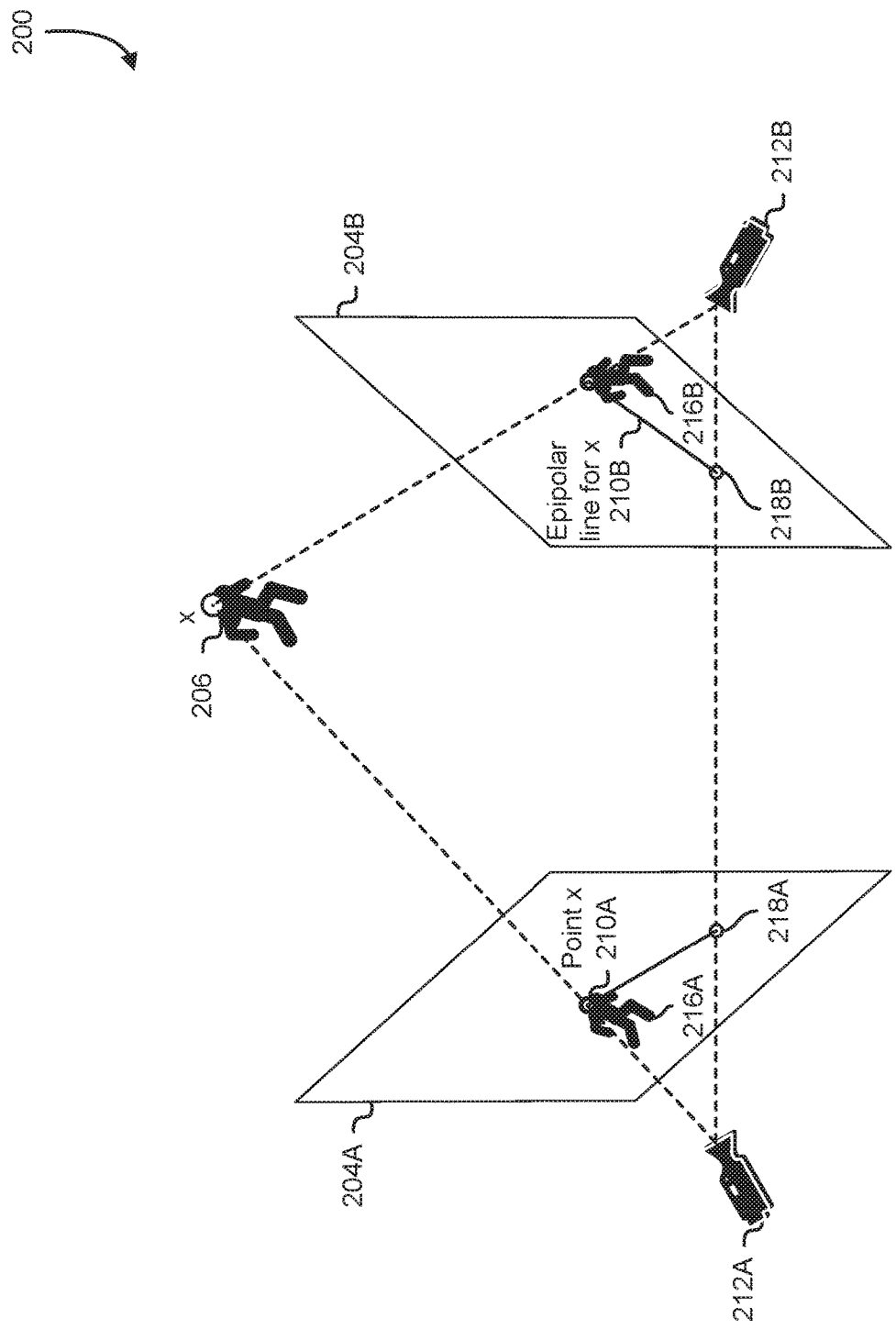
FIG. 2 illustrates another example of multi-camera image capture of a shared scene in accordance with an embodiment.

FIG. 2 illustrates an aspect of an environment 200 in which an embodiment may be practiced. As illustrated in FIG. 2, the environment 200 may include a first image capture device 212A that captures a first image 204A simultaneous with a second image capture device 212B that captures a second image 204B, where both images 204A-04B include digital representations 216A-16B of an object 206 in the scene common to both image capture devices 212A-12B. In the first image 204A, a point 210 on the digital representation 216A is seen to correspond to a point (e.g., the center of the helmet of the object 206) on the object 206. The point 210A in the first image can be seen to correspond to an epipolar line 210B in the second image 204B.

The images 204A-04B may be two-dimensional digital images captured by respective image capture devices 212A-12B, such as the image capture devices 112A-12B of FIG. 1. The fields of view of the cameras 212A-12B may overlap (e.g., such as can be seen in FIG. 1), resulting in each of the images 204A-04B having digital captures of objects common to both fields of view, such as the digital representations 216A-16B of the object 206. Each of the images 304A-04B may be a numeric (e.g., binary) representation of a two-dimensional image that comprise a set of picture elements (pixels). Each of the images 304A-04B may contain a fixed number of rows and columns of pixels holding values that represent the brightness of a given color at that specific point. The images 304A-04B may be formatted according to a specific image format, such as Graphics Interchange Format (GIF), Joint Photographic Experts Group (JPEG), Portable Network Graphics (PNG), bitmap (BMP), or Tagged Image File Format (TIFF).

The object 206 may be an object similar to one of the objects 106 described in conjunction with FIG. 1. The image capture devices 212A-12B may be similar to the image capture devices 112A-12B described in conjunction with FIG. 1. The digital representations 216A-16B may be sets of pixels in the respective images 204A-04B that represent the object 206.

The epipoles 218A-18B may be points where a line from the focal center of the first image capture device 212A to the focal center of the second image capture device 212B intersects in their respective images 204A-04B. That is the epipole 218A is the point of intersection in the image 204A of the line from the first image capture device 212A, and the epipole 218B is the point of intersection in the image 204B of the same line. The line that intersects the epipoles 218A-18B may be determined from information about the physical proximity and orientation of each of the cameras. The relationship between the positions of the cameras may be determined initially using static correspondence points in the background. For example, in an American football field, the yard lines are known to lie on a flat surface, be 10 yards apart, and parallel to each other. Consequently, by detecting a pair of yard lines in an image, the pixel coordinates of the yard lines may be used to determine the angle, position, and distance of the camera from the field. By determining the angle, position, and distance of a pair of cameras from the field, the cameras' positions and orientations of their respective focal points can likewise be calculated.

Additionally or alternatively, the line that intersects the epipoles 218A-18B may be derived based on differences in perspectives of static features (e.g., yardage lines on a field, base of a goal post, or other stationary object or background feature) common in the shared scene of the images 204A-04B. That is, given a determined point-to-point correspondence of sets of points in any two images of the same scene, the relationship between the two images may be expressed as a fundamental matrix, which is a 3×3 matrix that constrains where the projection of points from the scene can occur in both images. The sets of points used to generate the fundamental matrix may be determined using static features (e.g., yardage lines, stationary objects, or some other static background features) in each of the images. Given the projection of a scene point into one of the images, the corresponding point in the other image is constrained to a line. In some examples, an "epipolar constraint" refers to the relation between corresponding image points that the fundamental matrix represents.

The reference point 210A may be a point on or proximate to the digital representation 216A of the object 206. The reference point 210A may be used to indicate or represent the position of the digital representation 216A in the image 204A. That is, the reference point 210A may refer to a point on or proximate to the object 206 in the real world. In the illustrative example of FIG. 2, the reference point 210A corresponds to a point in the center of the helmet of the object 206. As can be seen, the point in the center of the helmet of the object 206 and the focal centers of the image capture devices 212A-12B form an image plane. The intersection of the image plane and the image 204B, therefore yields the epipolar line 210B, which, under, under ideal conditions, intersects the digital representation 216B at the point corresponding to the point on or proximate to the object 206 as does the reference point 210A. Thus, given a reference point 210A (x) corresponding to a point in the digital representation 210A of the object 206 in the image 204, and a point representing the epipole 218A (e) (which may be derived using the fundamental matrix) corresponding to an intersection in the image 204A of the line between the focal centers of each camera, the epipolar line 210B (L) may be calculated according to the formula:

$$L = e \times x$$

Figure 3:
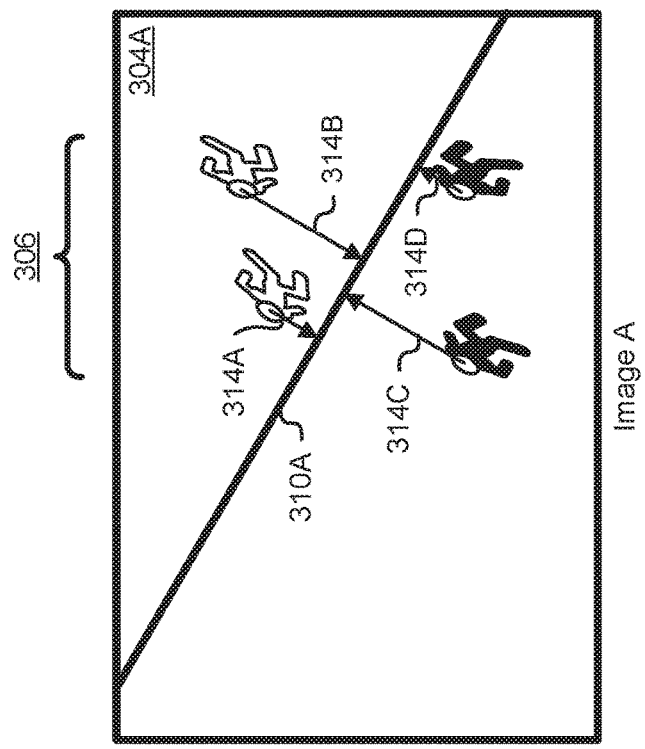
FIG. 3 illustrates an example of an epipolar constraint in accordance with an embodiment.
Figure 3:
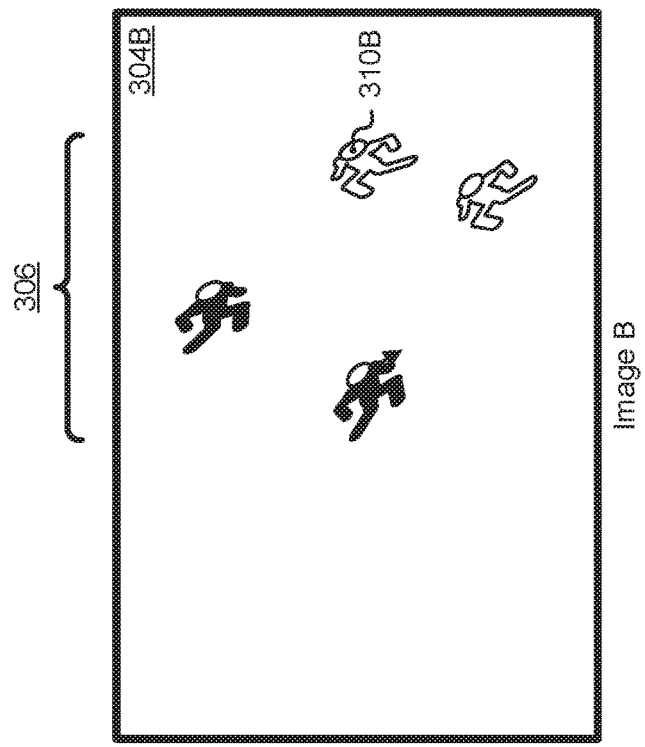

FIG. 3 illustrates an example 300 of an embodiment of the present disclosure. Specifically, FIG. 3 depicts a process for quantifying costs of associating objects 306 in a first image 304A with objects 306 in a second image 304B, where the objects 306 were captured by image capture devices (e.g., the recording devices 112 of FIG. 1) from different positions. The costs are quantified based on distances 314A-14D of each object in one image (e.g., the first image 304A) to an epipolar line 310A generate based on a reference point 310B of an object in the other image (e.g., the second image 304B).

The images 304A-04B may be similar to the images 204A-04B described in conjunction with FIG. 2.

For example, the objects 306 may be digital representations of animate, real-world objects and therefore their two-dimensional shapes as captured in digital representations (e.g., sets of pixels of the images 304A-04B) may change between frames in a sequence of digital image captures due to the real-world objects being in motion. Likewise, because the digital representations of the images 304A-04B are captured from different perspectives, the two-dimensional shape of a particular object's representation in the first image 304A may not match its corresponding two-dimensional shape in the second image 304B (e.g., a silhouette of an object from the side may not match a silhouette of the same object from the back unless the object is rotationally symmetric). Furthermore, in a situation where the objects 306A-06B share visual similarities (e.g., such as a sporting event where players of the same team are the same general shape and wear the same uniform and color combinations, or capturing images of a group of animals of the same species), matching objects by their shape and colors may not provide sufficient confidence that a set of pixels in the first image 304A and a set of pixels in the second image 304B are representative of the same object. Techniques described in the present disclosure, however, provide a mechanism for matching objects in one image with their corresponding objects in another image.

In some implementations, objects being tracked may have a common feature allowing the objects 306 to be distinguished from other objects (e.g., sports players distinguished from referees in the same field of view) or from the background (e.g., sports players from the sports ball in the same field of view). For example, because an American football helmet is of a general round shape from most angles, a system of the present disclosure may identify the objects 306 of interest by identifying the helmets in the image using one or more object detection techniques. The object detection techniques utilized may include one or more of edge detection, corner detection, blob detection, or ridge detection. Examples of such techniques include Canny edge detector, Sobel operator, Harris & Stephens/Plessey/Shi-Tomasi corner detection algorithms, SUSAN corner detector, level curve curvature, features from accelerated segment test (FAST), Laplacian of Gaussian (LoG), difference of Gaussians (DoG), Monge-Ampére operator, maximally stable external regions (MSER), principal curvature-based region detector (PCBR), and grey-level blobs. However, since one helmet may be difficult to distinguish from other helmets of the same team, techniques of the present disclosure may be used to match an object in the first image 304A with its corresponding object in the second image 304B even though the images 304A-04B were captured from different perspectives and positions.

As described above, the reference point in one image will correspond to an epipolar line in the other image. Likewise, within the shared fields of view of the images, each pixel (e.g., a center point of a helmet) in one image will correspond to an epipolar line in the other image. Ideally, for a reference point in the second image 304B, an epipolar line would be generated to directly pass through the equivalent point in the first image 304A; for example, a line generated in a first image 304A based on center point of a helmet in the second image 304B would ideally pass through a center point of the corresponding helmet in the first image 304A. However, due to various factors (e.g., camera jitter, precision of object detection, precision of distance and angle relationships between the cameras, etc.) the line generated for the first image 304A based on the reference point in the second image 304B may not always pass through the point in the first image 304A exactly equivalent to the reference point.

Selecting the closest object to the epipolar line in the first image, however, runs the risk that the selected object may actually be associated with a different object in the second image 304B. Thus, the present disclosure provides a technique for quantifying the cost of each potential assignment of an object in the first image to an object in the second image using an epipolar constraint and a homography constraint. For an epipolar constraint, a cost for each potential assignment may be determined, and then a homography constraint may be applied to make the assignment based upon the cost matrix.

The objects 306 may be sets of pixel values representing real-world objects in a scene that was captured as one or more digital images, such as the images 304A-04B. As pictured in the example 300, the objects 306 represent human figures in the scene. The reference point 310B may be a point (e.g., pixel position) associated with an object (e.g., one of the objects 306) in an image (e.g., image 304B). Relatedly, the epipolar line 310A may be an epipolar line generated in the other image (e.g., image 304A) based on the reference point 310B. As can be seen in the illustrative example 300, the epipolar line 310A does not directly pass through any of the objects 306 in the image 304A. Consequently, as described below, a cost matrix will be generated based in part on the distances 314A as part of the process for determining which of the objects 306 in the image 304A correspond to the reference point 310B.

The distances 314A-14D may be distances measured from a reference point of the respective objects 306 to the epipolar line 310A. In some embodiments, the distances 314A-14D are measured in number of pixels between the reference point and the epipolar line 310A; however it is contemplated that other units of measure may be used. The distances 314A-14D may be the shortest distances between the reference point and the epipolar line 310A (e.g., the length of the line from the reference point to a point of perpendicular (i.e., normal) intersection with the epipolar line 310A.

In an embodiment, a cost matrix is generated for each of the images 304A-04B, where components of the cost matrices include, for each object, a distance (e.g., the distances 314A-14D) from a reference point (e.g., center point of a helmet) to the epipolar line 310A for each of the objects 306. For example, in a situation where the first image 304A has m objects and the second image 304B has n objects, the following cost matrix may be created for the first image:

$$\begin{bmatrix} dA_{11} & \cdots & dA_{1n} \\ \vdots & \ddots & \vdots \\ dA_{m1} & \cdots & dA_{mn} \end{bmatrix}$$

where $dA_{11}$ is the shortest distance of a $1^{st}$ object in the second image 304B to a $1^{st}$ line in the second image 304B generated based on a point of a $1^{st}$ object in the first image 304A, $dA_{1n}$ is the shortest distance of an $n^{th}$ object in the second image 304B to the first line in the second image 304B, $dA_{m1}$ is the shortest distance of a $1^{st}$ object in the second image 304B to an $m^{th}$ line in the second image 304B generated based on a point of an $m^{th}$ object in the first image 304A, and $dA_{mn}$ is the shortest distance of an $n^{th}$ object in the second image 304B to the $m^{th}$ line in the second image 304B (i.e., $d[istance])_{[image\ A\ object][image\ B\ object]}$).

In a similar manner, a cost matrix may be created for the second image:

$$\begin{bmatrix} dB_{11} & \cdots & dB_{1m} \\ \vdots & \ddots & \vdots \\ dB_{n1} & \cdots & dB_{nm} \end{bmatrix}$$

where $dB_{11}$ is the shortest distance of a $1^{st}$ object in the first image 304A to a $1^{st}$ line in the first image 304A generated based on a point of a $1^{st}$ object in the second image 304B, $dB_{1m}$ is the shortest distance of an $m^{th}$ object in the first image 304B to the first line in the first image 304A, $dB_{n1}$ is the shortest distance of a $1^{st}$ object in the first image 304A to an $n^{th}$ line in the first image 304A generated based on a point of an $n^{th}$ object in the second image 304B, and $dB_{nm}$ is the shortest distance of an $m^{th}$ object in the first image 304A to the $n^{th}$ line in the first Image 304A (i.e. $d[istance]_{[image\ B\ object][image\ A\ object]}$).

The cost matrices (the cost matrix for the first image and the cost matrix for the second image) may be used to determine the cost of assigning the particular object in one image to an object in the other image using a homography constraint, as explained in detail below. Note that although techniques described in the present disclosure refer to a pair of images having a shared portion of a scene (e.g., recording devices 112A-12B of FIG. 1), it is contemplated that techniques of the present disclosure may be applicable to any number of images and image capture devices. For example, FIG. 1 depicts an example embodiment with at least 14 recording devices with two or more sharing portions of the same fields of view. More specifically, for an implementation where three cameras share a portion of the same view and simultaneously take image captures resulting in image A, image B, and image C, up to six matrices may be generated; i.e., two matrices for each of the three images. For an implementation where four cameras share a portion of the same view, up to 12 matrices may be generated; i.e., three matrices for each of the four images, and so on.

Figure 4:
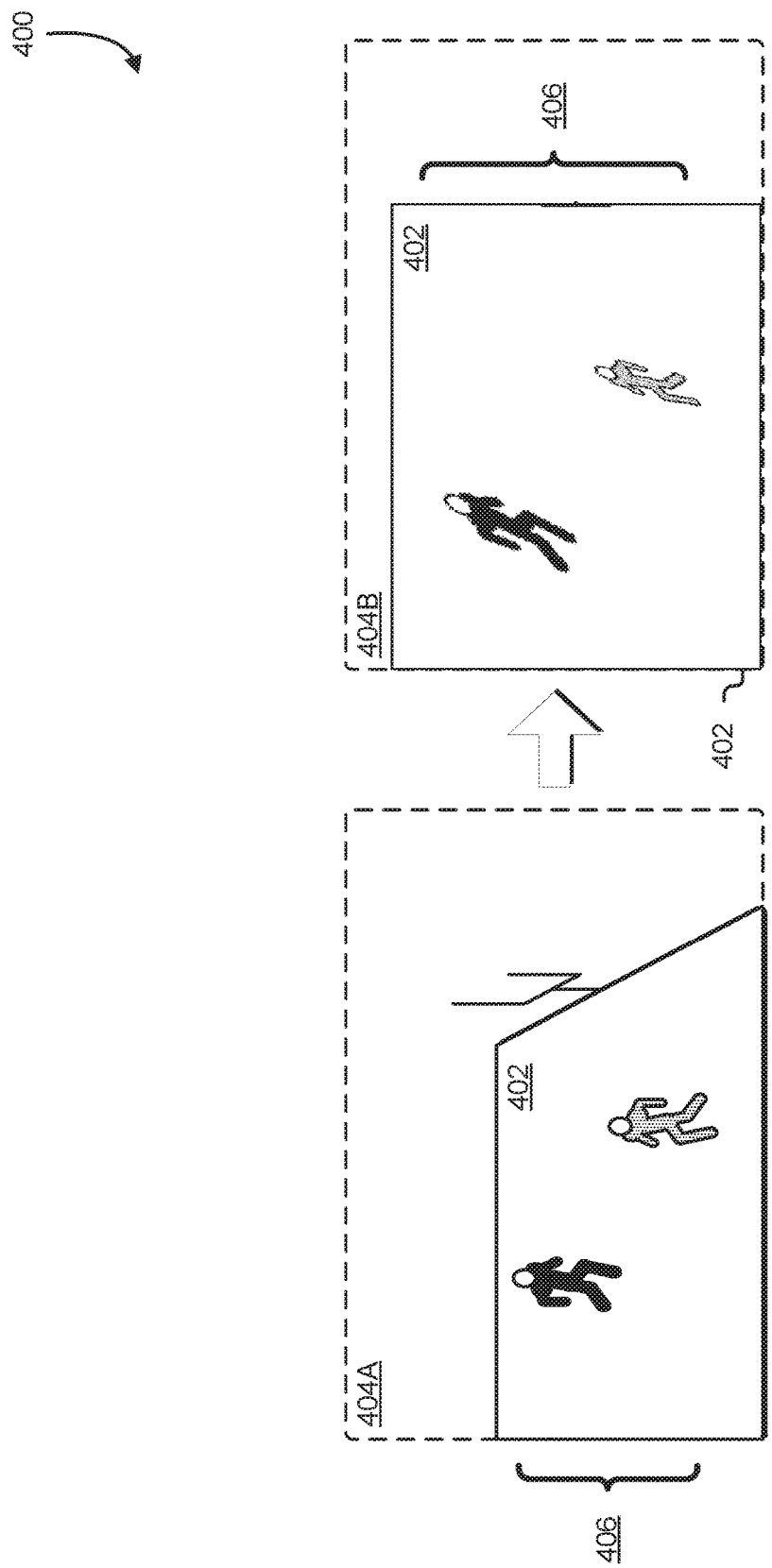
FIG. 4 illustrates an example of transforming an image in accordance with an embodiment.

FIG. 4 illustrates an example 400 of an embodiment of the present disclosure. Specifically, FIG. 4 depicts a process for transforming an image during determining a homography constraint for the purpose of assigning objects in one image to objects in another image. If the background surface 402 is flat (such as the sports field of the physical environment 102 depicted in FIG. 1), the first and second images may be modified, (e.g., stretched) based on information relating to how the image capture devices (e.g., 212 of FIG. 2) are positioned relative to each other in the physical world, in order to align the image with the background surface. For example, as shown in the example 400, the image 404A, being taken from the perspective of the image capture device, renders the portion of a three-dimensional background surface in the physical world as an approximate trapezoid in two-dimensions. The image 404B, however, shows the background surface 402 as it has been stretched to replicate the rectangular shape of the background surface in the physical world. The objects 406, as can be seen, because they are not planar, may become distorted in some manner in in the image 402B due to the stretching. Moreover, depending on the positions and perspectives of the image capture devices, objects in each of the images captured by the image capture devices may be distorted in differing amounts and in different directions.

The background surface 402 may be a representation of a surface in the physical environment. The background surface 402 may be represented in two dimensions in the images 404A-04B. The illustrative example 400 depicts a background surface of a sports field. The background surface 402 may be planar, although it is contemplated that techniques of the present disclosure may be applied to surfaces that are not necessarily flat or uniform in color or texture. In the physical world, the real world objects represented by the objects 406 may be proximate to the surface and may interact with the surface.

The image 404A may be a digital image similar to the images 204A-04B described in conjunction with FIG. 2. As can be seen in the example 400, the first image 404A has been captured by an image capture device from a perspective above and to the side of the scene captured within the field of view of the image capture device. The second image 404B is a digital image produced by transforming the perspective of the first image 404A to another perspective; specifically, the second image 404B has been transformed into an overhead perspective.

The objects 406 may be numeric representations (e.g., sets of pixels) of objects in the scene captured in the images 404A-04B by image capture devices, similar to the digital representations 216A-16B of FIG. 2. As can be seen, however, the objects 406 in the second image appear "stretched" as a result of the transformation performed on the first image 404A to produce the second image 404B. That is, as a result of the background surface 402 in the first image 404A being transformed from an asymmetric quadrilateral shape to a rectangle in the second image 404B, the objects 406 have been stretched vertically and skewed in a clockwise direction. The more distant of the objects 406 may be transformed to a greater extent than the nearer object.

Figure 5:
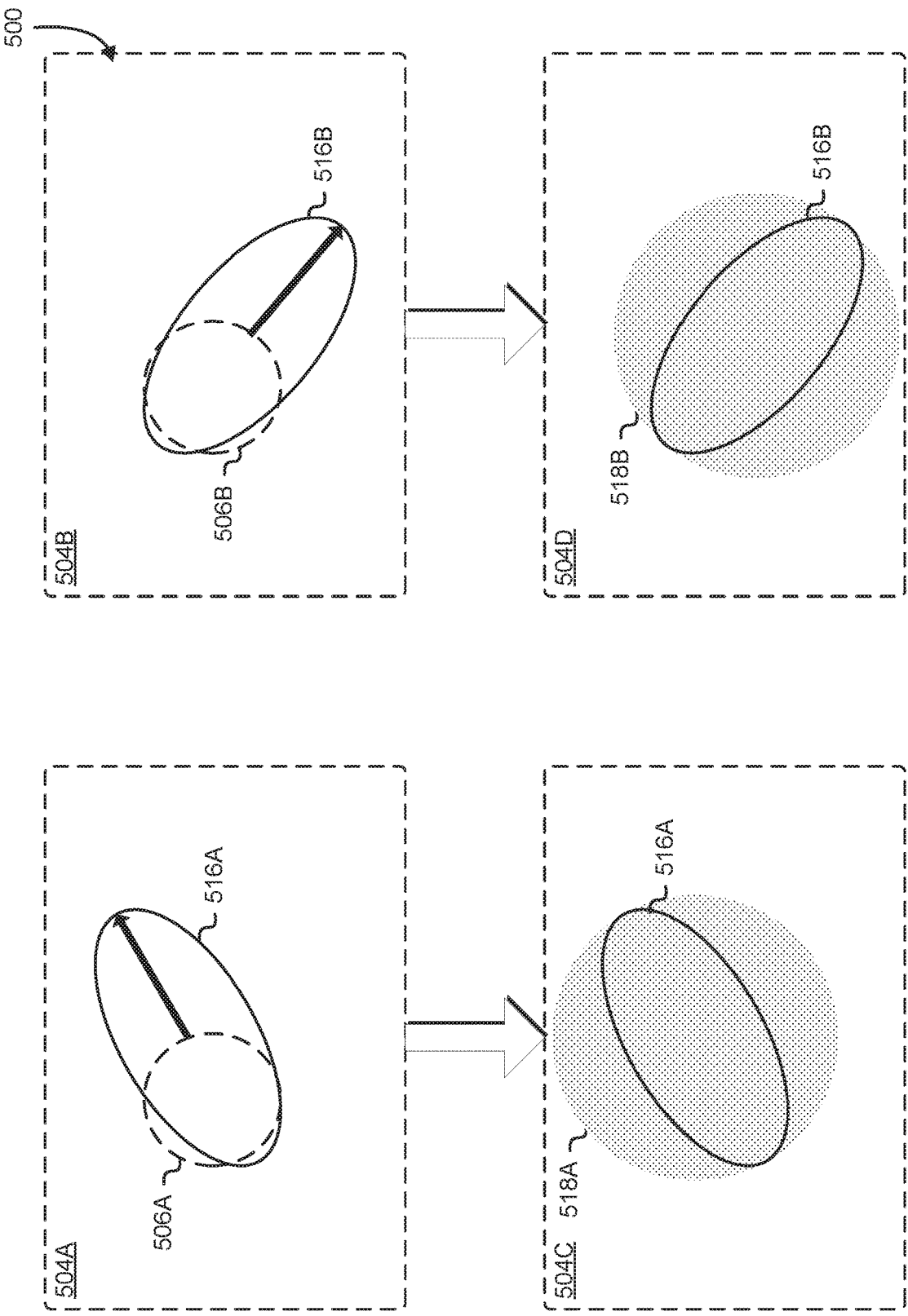
FIG. 5 illustrates an example of determining a region of interest of a homography constraint in accordance with an embodiment.

FIG. 5 illustrates an example 500 of an embodiment of the present disclosure. Specifically, FIG. 5 illustrates determining regions of interest 518A-18B based on the distortion of digital representations 506A-06B of objects in respective images due to stretching the respective images to fit a background surface (as described in conjunction with FIG. 4, yielding the transformed images 504A-04B and the transformed digital representations 516A-16B). The transformed images 504A-04B may be transformations of digital images, such as the images 304A-04B of FIG. 3, as a result of transforming the objects and background surface depicted in the images from the perspective of the cameras to fit the dimensions of the background surface (e.g., overhead view), such as in the manner described in conjunction with FIG. 4.

The digital representations 506A-06B may be sets of pixels representing the same physical object in respective images that share a scene, similar to the digital representations 306 of FIG. 3. For example, the digital representations 506A-06B may be sets of pixels representing football helmets in the scene captured by in the respective images. For illustrative purposes, the digital representations 506A-06B are displayed as a simple circular shape to more clearly demonstrate how, as a result of modifying (e.g., stretching) portions of the original digital images to fit the dimensions of a physical surface in a scene (e.g., fit to an overhead view of the playing field), the digital representations 506A-06B may themselves be transformed into the modified digital representations 516A-16B. The digital representations 506A-06B are drawn with a dashed line to indicate how the digital representations 506A-06B would have appeared in the scene prior to the transformation of their respective images, and, in embodiments, would not actually appear in the transformed images 504A-04B.

The modified digital representations 516A-16B may be transformations of the digital representations 506A-06B as a result of the transformation performed to yield the transformed images 504A-04B. For illustrative purposes, the modified digital representations 516A-16B are displayed as a simple oval shape to more clearly demonstrate how the modified digital representations 516A-16B are transformed from the digital representations 506A-06B.

The regions of interest 518A-18B may be regions within which reference points of the respective objects represented by the digital representations 506A-06B may be found. That is, if the images are transformed in the manner described for FIG. 4 to fit the geometry of the physical surface (e.g., physical surface 102), the regions of interest 518A-18C may be the most likely location of the reference point in coordinates of the geometry of the physical surface.

The regions of interest 518A-18B (homography constraint) may be combined with the matrices produced from the epipolar constraint in a variety of ways. For example, each of the distances (e.g., the distances 314A-14D of FIG. 3) of objects to the epipolar line that comprises the matrix of that image (as described above in conjunction with FIG. 3) may be weighted (e.g., by adding, multiplying, etc.) by the radius of the region of interest that corresponds to that object. Thus, for example, if the region of interest 516A corresponds to the object in the first image 304A having the distance 314A, the distance 314A element of the matrix for the first image 304 may be weighted by the radius of the region of interest 314A.

From there, the matrices for each of the images may be combined. The combination may be performed in a variety of ways. For example, one of the matrices produced from the epipolar constraint as described above in conjunction with FIG. 3 may be transposed and added to the other matrix to produce an m×n or n×m matrix. In this manner, the epipolar constraint and the homogrophy constraint may be combined. The objects in the image may be matched by determining which combination of matches results in the lowest estimated cost if the matrices or combined matrix is provided as input to cost estimation algorithm (also referred to as the lowest-cost assignment). For example, a combinatorial optimization algorithm, such as the Hungarian algorithm, may be applied to the resultant matrix to determine which object-to-object assignment combination results in the lowest overall cost. In some examples, a combinatorial optimization algorithm is an algorithm constructed to find an optimum (e.g., shortest path) solution in a finite set of items. The combination with the lowest overall cost may be used as the final object-to-object mapping between the images. Note, however, that while a given combinatorial optimization algorithm may not necessarily result in a correct or even an optimal assignment, the lowest-cost assignment may provide a suitable initial object-to-object assignment.

The association of an object in one image with an object in the other image may be stored in a data store for later use. Additionally or alternatively, this object-to-object association may be used to determine or validate the assignment of trajectories described in conjunction with FIGS. 8-11. Additionally or alternatively, the object-to-object association may be output to a user or caused to be displayed visually on a display device (e.g., computer screen).

Neither the epipolar constraint nor the homography constraint necessarily relies on the image capture devices being calibrated or determining a zoom level of the image capture devices. Use of the triangulation constraint, however, may be dependent upon having calibrated image capture devices. For the triangulation constraint, the three-dimensional position of a point in physical space may be determined based on coordinates of the point in a first image captured by a first image capture devices and coordinates of the point in a second image captured by a second image capture device, and certain parameters (e.g., zoom level, etc.) of the image capture devices.

In embodiments, the triangulation constraint may be used to increase the accuracy of matching objects in one image with objects in another. For example, a pair of objects may be determined to not match each other if the triangulation constraint indicates that a reference point on one of the objects object in one image matched with a reference point on the other object in another image would position the object below the physical surface (e.g., if the a football player's calculated height is a negative value).

Figure 6:
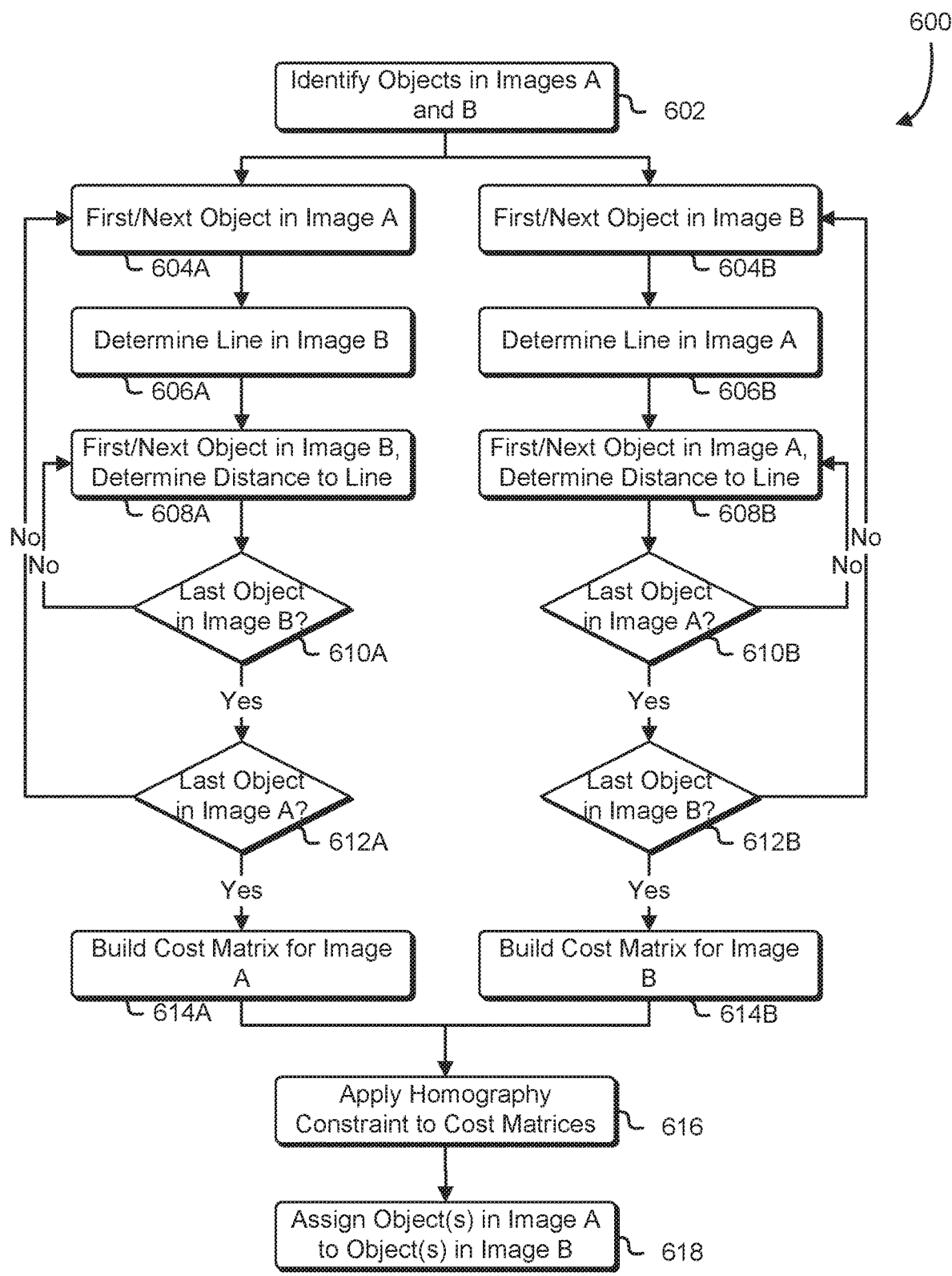
FIG. 6 is a flowchart that illustrates an example of computing epipolar constraint matrices in accordance with an embodiment.

FIG. 6 is a flowchart/block diagram illustrating an example of a process 600 for computing a pair of epipolar constraint cost matrices in accordance with various embodiments. Some or all of the process 600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 13:
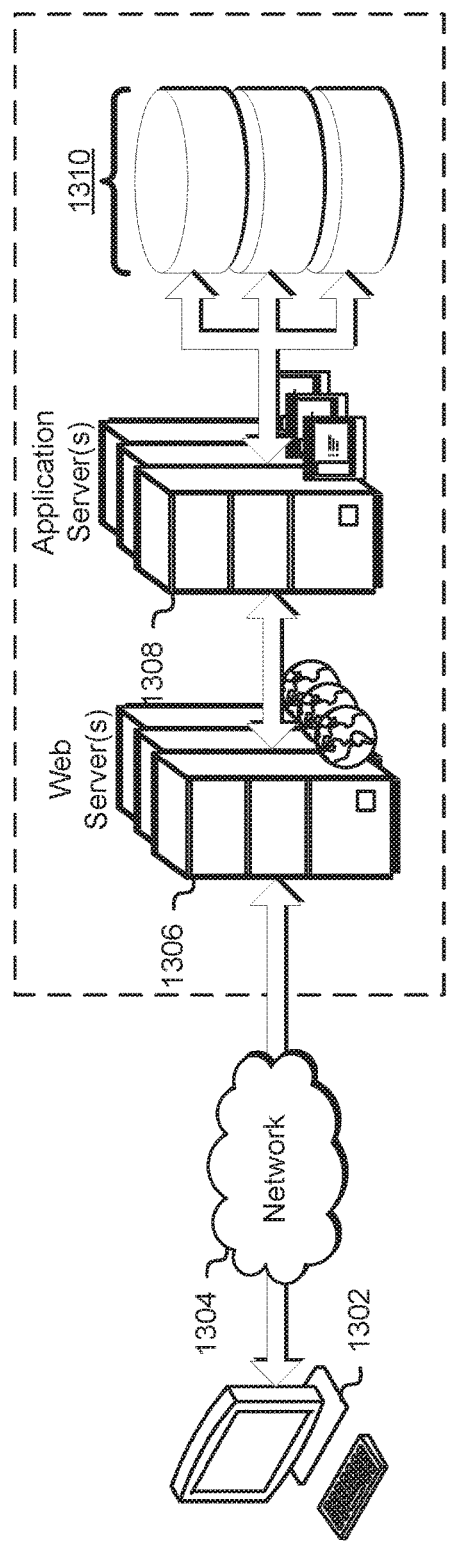
FIG. 13 illustrates an environment in which various embodiments can be implemented.

For example, some or all of process 600 may be performed by any suitable system, such as a server in a data center, by various components of the environment 1300 described in conjunction with FIG. 13, such as the one or more web servers 1306 or the one or more application servers 1308, by multiple computing devices in a distributed system of a computing resource service provider, or by any electronic client device such as the electronic client device 1302. The process 600 includes a series of operations wherein the system identifies objects in each of two objects and, for each object in one image, computes a line in the other image and determines the distances of the objects in that image to the line. Once all of the images have been cycled through, the system constructs matrices using the determined distances.

In 602, the system identifies objects in each of a pair of images. For example, the system may be configured to detect sets of pixels that match one or more of certain specified criteria, such as shape (e.g., round, oval, square, rectangular, or some other specific shape), color (e.g., white, red, green with a yellow stripe, etc.), or other characteristic usable to identify a sets of pixels as corresponding to representations of the objects of interest.

As a specific example, the system may be configured to analyze the images for occurrences of American football helmets in the images. As noted, the object may be detected using one or more of various techniques, such as Canny edge detection, Sobel operator, Harris & Stephens/Plessey/Shi-Tomasi corner detection algorithms, SUSAN corner detector, level curve curvature, FAST, LoG, DoG, MSER, or grey-level blobs.

In 604A, the system performing the process 600 locates the first (or next) object in the first image. The system may determine a reference point for the object in the first image, such as a pixel in the center of the identified object. Likewise, in 604B, the system may locate a first (or next) object in the second image. Similarly, the system may determine a reference point for the object in the second image.

In 606A, the system performing the process 600 calculates, based on the reference point determined in the first image in 604A and the determined relationship between the first image and the second image (see the description of FIG. 2), an epipolar line that crosses through the second image. Note that epipolar line may not necessarily be "drawn" into the second image itself, but may simply be a computation of a line in the coordinate system represented by the second image. Similarly, in 608B, the system calculates, based on the reference point determined in the second image in 604B and the determined relationship between the first image and the second image, an epipolar line that crosses through the first image.

In 608A, the system performing the process 600 computes a distance from a first/next object in the second image to the epipolar line calculated in 606A. The distance may be computed from a reference point (e.g., center of the detected object, closest edge of the detected object, etc.) of the first/next object in the second image. Similarly, in 608B, the system computes a distance from the first/next object in the first image to the epipolar line calculated in 606B. The distance may be computed from a reference point of the first/next object in the first image. In embodiments, the distances are measured in pixels. In some implementations, the distances are straight-line distances; however, it is contemplated that, in other implementations, other units of distance may be used (e.g., inches, centimeters, feet, etc.). It is further contemplated that, in some implementations, the distances may be Manhattan distances, squared, or otherwise weighted.

In 610A, the system performing the process 600 determines whether the distances for all of the objects in the second image to the epipolar line determined in 606A have been computed. If so, the system proceeds to 612A. Otherwise, the system returns to 608A to compute the distance of the next object in the second image. Likewise, in 610B, the system determines whether the distances for all of the objects in the first image to the epipolar line determined in 606B have been computed. If so, the system proceeds to 612B. Otherwise, the system returns to 608B to compute the distance of the next object in the first image.

In 612A, the system determines whether, for each object in the first image, epipolar lines in the second image have been calculated. If so, the system proceeds to 614A. Otherwise, the system returns to 604A to determine a reference point for the next object in the first image. Likewise, in 612B, the system determines whether, for each object in the second image, epipolar lines in the first image have been calculated. If so, the system proceeds to 614B. Otherwise, the system returns to 604B to determine a reference point for the next object in the second image.

In 614A, the system performing the process 600 constructs a first cost matrix for each of the distances computed in the operations of 608A-12A. For example, rows of the matrix may represent the objects identified in the first image, while columns of the matrix may represent objects in the second image, or vice versa. Likewise, in 614B, the system constructs second cost matrix for each of the distances computed in the operations of 608B-12B. Also similarly, rows of the matrix may represent the objects identified in the first image, while columns of the matrix may represent objects in the second image, or vice versa. Note that it is contemplated that the matrix may be constructed dynamically during the operations of 604A-12A and **604*b*-12B** rather than in separate operations.

In 616, the system performing the process 600 applies a homography constraint (see FIG. 7) to one or more of the elements of the cost matrices. For example, an element of the first cost matrix representing a distance from an object in the second image to the epipolar line may further be weighted by the size of a region of interest around the object after the object has been transformed in a manner described in FIGS. 4-5. Likewise, elements of the second cost matrix representing distances from objects in the first image to epipolar lines may further be weighted by the size of regions of interest around the transformed objects in the first image.

Finally, in 618, the system performing the process 600 matches the objects identified in the first image with the objects identified in the second image based on the first and second matrices. For example, the system may utilize the Hungarian algorithm or other combinatorial optimization algorithm to determine a lowest-cost object-to-object combination. Note that one or more of the operations performed in 602-18 may be performed in various orders and combinations, including in parallel. For example, although the operations of 604A-14A are illustrated and described above as occurring in parallel with 604B-14B, it is contemplated that these operations may be performed in series or as alternating operations. Also note that although the process 600 is described in conjunction with only images, it is contemplated that the techniques may be applied to multiple images sharing the same scene. For example, the operations 602 may identify objects in three images, in which case the operations of determining a reference point of first/next object in one image, determining a line in another image, determining a distance from a first/next object in the other image to the line, and so on may be repeated for each pairwise combination (six pairwise combinations for three images: A-to-B, A-to-C, B-to-A, B-to-C, C-to-A, C-to-B).

Figure 7:
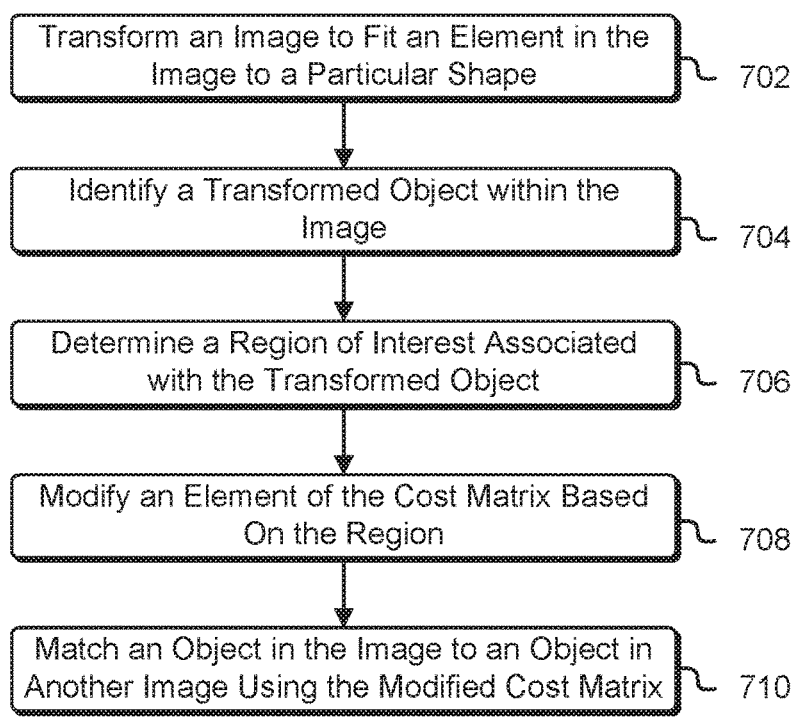
FIG. 7 is a flowchart that illustrates an example of determining a homography constraint in accordance with an embodiment.

FIG. 7 is a flowchart illustrating an example of a process 700 for applying a homography constraint in accordance with various embodiments. Some or all of the process 700 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 700 may be performed by any suitable system, such as a server in a data center, by various components of the environment 1300 described in conjunction with FIG. 13, such as the one or more web servers 1306 or the one or more application servers 1308, by multiple computing devices in a distributed system of a computing resource service provider, or by any electronic client device such as the electronic client device 1302. The process 700 includes a series of operations wherein an image is transformed such that a set of pixels fit a particular shape and a transformed object is identified. A region of interest is identified, based on the transformed object and an element of a cost matrix is modified based on the region.

In 702, the system performing the process 700 may transform an image of a scene, such as the image 404A of FIG. 4, in a manner such that an element of the scene fits a particular geometry, such as in the manner that the image 404B has been stretched so as to fit the background surface 402 to the geometry of an overhead view of the actual physical surface. In 704, the system performing the process 700 identifies a (transformed) object within the transformed image that corresponds to an object identified (e.g., in the operations of 602 of FIG. 6) in the untransformed image. The transformed objects may be identified in a similar manner as the untransformed objects, such as by using algorithms for edge detection, corner detection, blob detection, ridge detection, and so on.

In 706, the system performing the process 700 determines a region of interest associated with the transformed object. The region of interest may be based on various factors, such as the size and/or shape of the transformed object. For example, in some implementations, the region of interest may fit to the shape of the transformed object. In other implementations, the region of interest may be the area of a circle, or some other shape, that surrounds the transformed object.

In 708, the system modifies the value of an element corresponding to the untransformed object in a matrix (e.g., the matrix of 614A or 614B of FIG. 6) of the untransformed image. The value may be modified based on the size of the region of interest (e.g., radius (e.g., length in pixels), diameter, area (e.g. in pixels), etc.). The operations of 708 may correspond to the operations 616; thus, the operations 702-08 may be performed for each of the images being processed by the process 600.

In 710, the system utilizes the modified matrix to match the objects in one image to the objects in another image. For example, the modified matrix for a first image may be combined (e.g., added) with a modified matrix of another image, and then the Hungarian algorithm may be applied to find a lowest cost assignment of objects in one image to objects in the other image. The operations of 710 may correspond to the operations of 618 of FIG. 6.

In some embodiments, the modified matrix may be further modified using a triangulation constraint. For example, if the positions, zoom levels, and relationships between the image capture devices that captured the scenes are known, a triangulation algorithm may be executed to, based on coordinates of an object in a first image captured by a first image capture device and coordinates of an object in a second image captured by a second image capture device, estimate a three-dimensional position in physical space. From that estimated position, an element in the matrix corresponding to the object-to-object mapping may be weighted based on an amount of deviation from an expected position in physical space. E.g., objects may be expected to be found at a height of 0 to 7 feet in the air, and estimated object positions that deviate from this range may be penalized with an increased cost (matrix value).

Note that the operations 704-10 may be repeated for each of the objects within the image. Note too that the operations of 702-10 may be repeated for each of the images sharing a common scene for which matrices are generated in accordance with the process 600 of FIG. 6. Note further that one or more of the operations performed in 702-20 may be performed in various orders and combinations, including in parallel.

Figure 8:
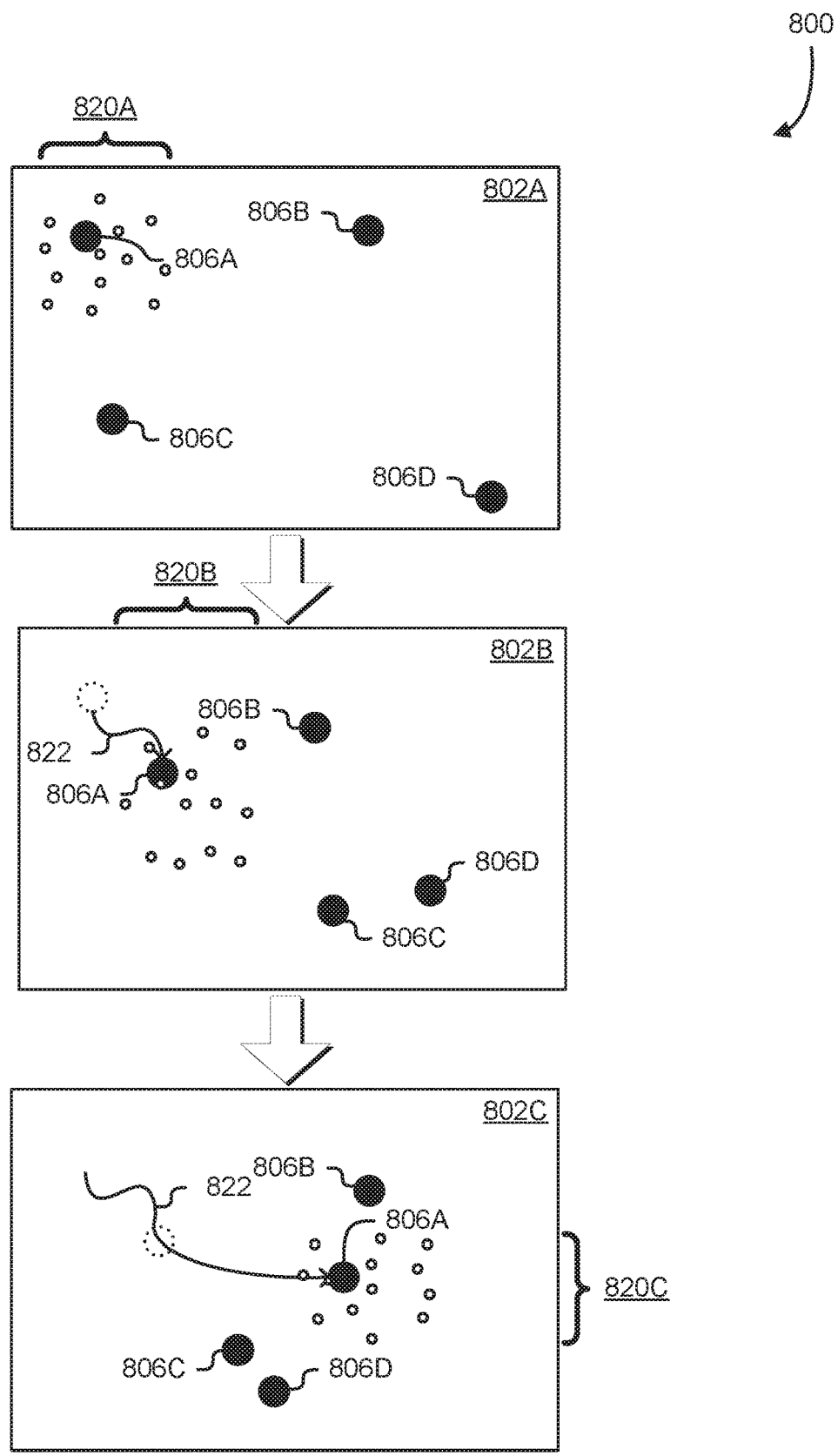
FIG. 8 illustrates an example of object tracking in accordance with an embodiment.
Figure 9:
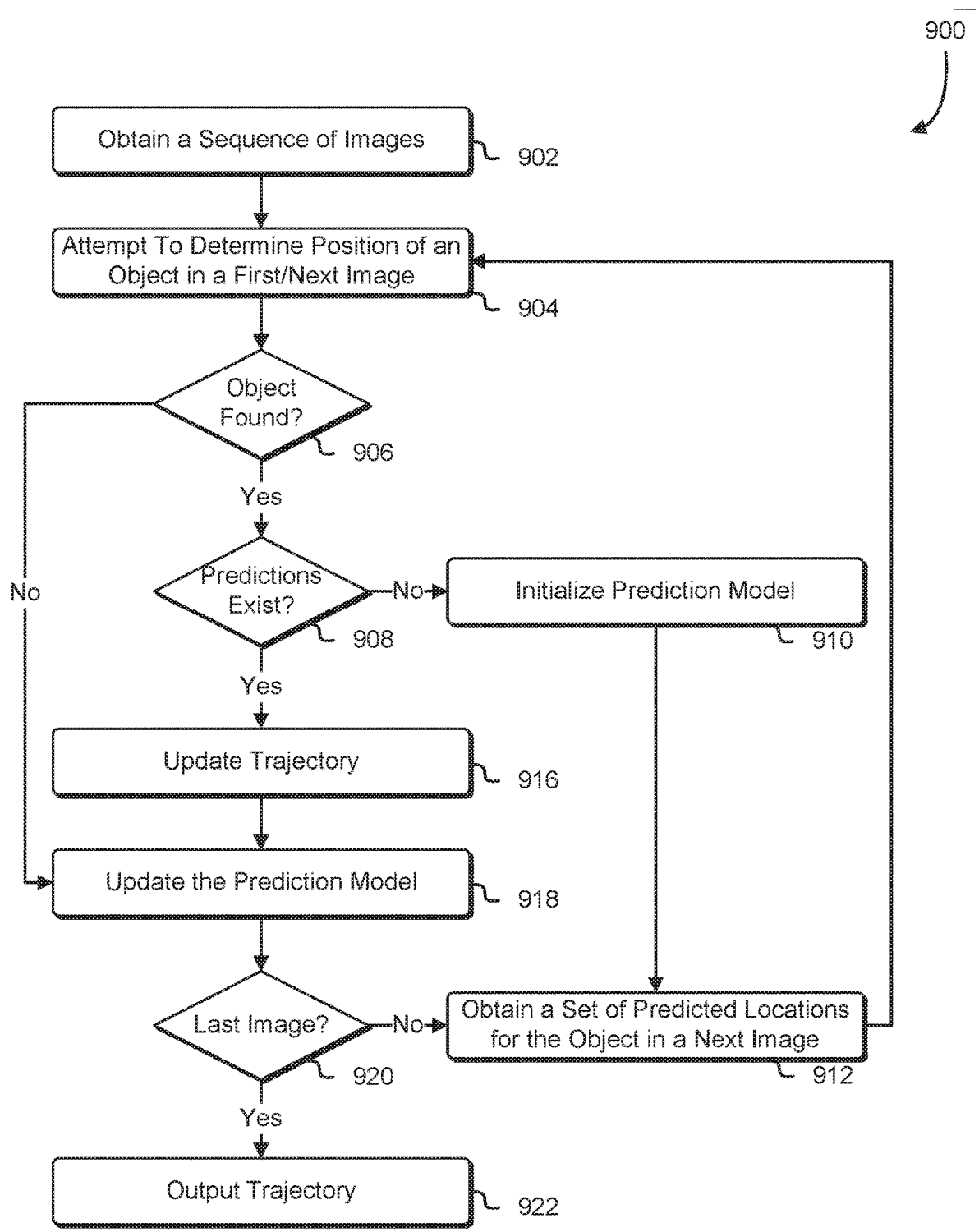
FIG. 9 is a flowchart that illustrates an example of object tracking in accordance with an embodiment.
Figure 10:
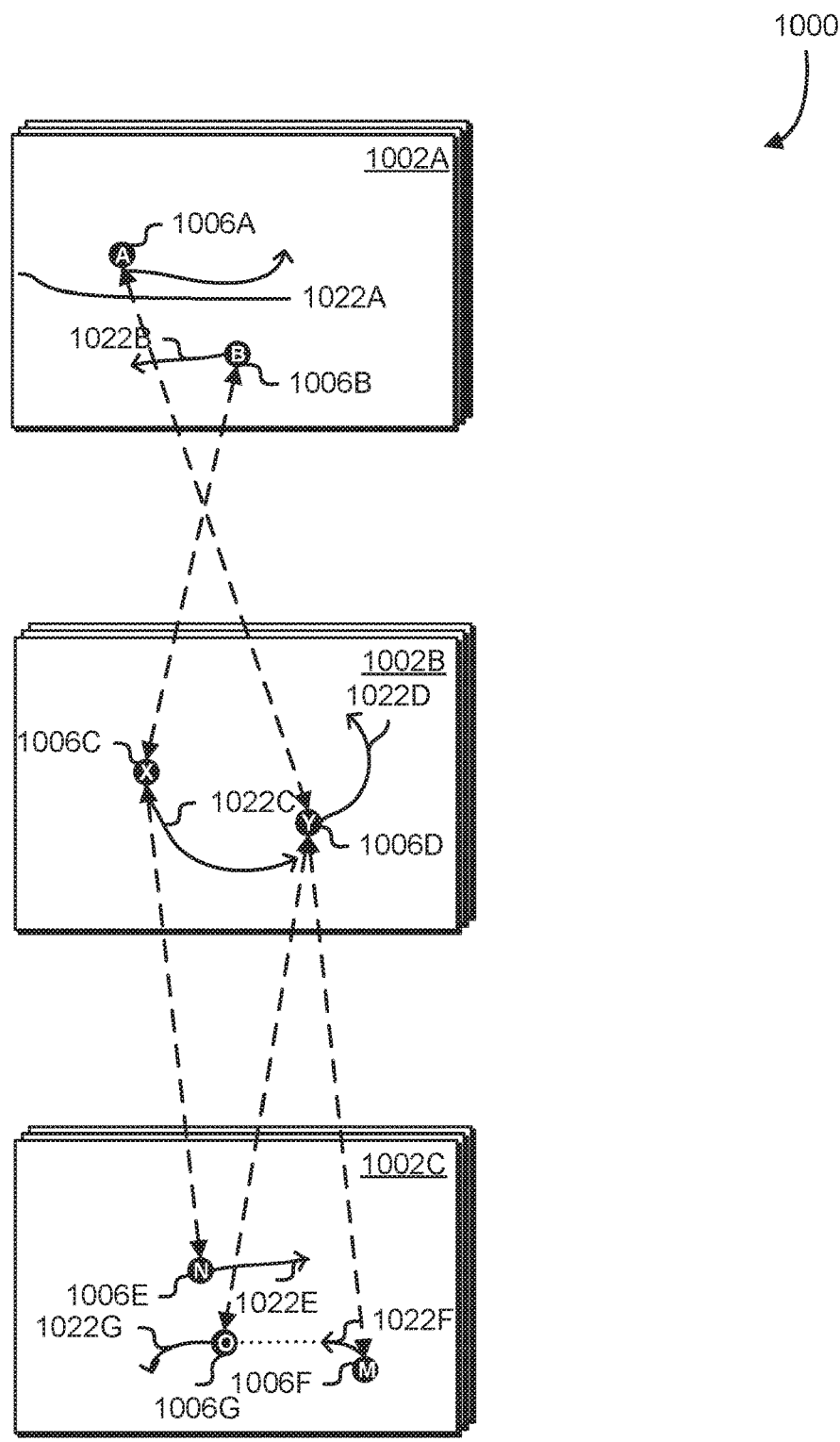
FIG. 10 illustrates an example of matching trajectories in accordance with an embodiment.

FIG. 8 illustrates an example 800 of an embodiment of the present disclosure. Specifically, FIG. 8 depicts a sequence of images 802A-02C captured over a period of time by an image capture device, such as one of the recording devices 112A of FIG. 1. Within each of the sequence of images 802A-02C are a set of objects 806A-06D representing objects in motion over the period of time. The example 800 further illustrates determining a trajectory 822 of a first object 806A based on a point cloud 820. Whereas the FIGS. 3-7 illustrate techniques for matching objects between images captured in parallel by two or more image capture devices, the techniques illustrated in FIGS. 8-9 are applicable to matching objects in successive images captured by a single image capture device in order to determine a trajectory traversed by an object over time. Furthermore, combining the techniques shown in FIGS. 3-9 allows trajectories of objects in a sequence of images of a scene captured by a first image device with trajectories of the same objects in a sequence of images of the same scene captured by a second image capture device simultaneously with the first image capture device, as illustrated by FIG. 10.

In an embodiment, each of the sequence of images 802A-02C is an image, similar to the image 304A or the image 304B of FIG. 3, recorded by an image capture device. Each of the sequence of images 802A-02C may be an image frame of a plurality of image frames that comprise a video recording of an event involving the objects 806A-06D.

In an embodiment, the objects 806A-06D are digital representation of objects in the scene recorded as the sequence of images 802A-02C by an image capture device. The object 806A-06D may be similar to the object 306 of FIG. 6. Note that although only the first object 806A is shown as having a trajectory (e.g., the trajectory 822), it is contemplated that the techniques described may be applied to one or more of the other objects 806B-06D to compute their respective trajectories.

In an embodiment, the point clouds 820A-20C are sets of points generated as a result of applying a prediction algorithm (e.g., one or more particle filters) to positions of the first object 806A. Each of the set of points in the point clouds 820A-20C may represent a prediction, according to a filter result, of a position of the first object 806A (e.g., a reference point on, in, or proximate to the first object 806A) in the next frame. In some implementations, the one or more particle filters apply physical laws of motions to one or more sequential measurements (e.g., previous positions of the first object 806A) to arrive at an estimate for a next position of the first object 806A. In some examples, the one or more particle filters include a recursive filter, such as a Kalman filter. Thus, a point in the point clouds 820A-20C may be a result output by a particle filter based on the present position, and, in some implementations, a past position, of the first object 806A.

As illustrated in the first image 802A, the position of the first object 806 may be input to a set of particle filters to produce the first point cloud 820A. In the example 800, the first image 802A may be the first image in the sequence, and consequently previous position and/or point cloud values for the object 806A may be unavailable. In such a case, the one or more particle filters may be seeded with one or more default values, such as a pseudo-random Gaussian distribution of values in the vicinity of (e.g., proximate to) the object 806A.

The object 806A may be identified in the second image 802B as being the same as the object 806A in the first image 802A by virtue of the object 806A in the second image 802B being in a position that lies within the region of points predicted in the point cloud 820A or within a standard deviation of one of the points predicted in the point cloud 820A. As can be seen in the example 800, the objects 806B-06D are located outside the region predicted by the point cloud 806A, and the second object 806B, although being the closest of the objects 806B-06D to the point cloud 806A, is not as close as the first object 806A. Consequently, the system of the present disclosure may determine that the first object 806A in the second image 802B corresponds to the first object 806A in the first image 802A. The system of the present disclosure may then associate the present position of the first object 806A (in the second image 802B) with the previous position of the first object 806A (in the first image 802A) in order to generate the trajectory 822 thus far.

The point cloud 820B may be generated by at least inputting the new position of the first object 806A in the second image 802B. In some implementations, the one or more particle filters may receive as input a previous position of the first object in the first image 802A and/or which of the particular particle filters appeared to most accurately predict the position of the first object 806A in the second image 802A, into the one or more particle filters. In some implementations, the types and/or numbers of particle filters used may be modified based at least in part on which, if any, of the previous particle filters appeared to most accurately predict the position of the first object 806A in the second image 802B. For example, the particle filters with predictions whose predictions were the farthest from the position determined to correspond to the first object 806A in the second image 802B may be replaced by different particle filters in the generation of the point cloud 820B. On the other hand, if all of the predictions were inaccurate (e.g., greater than a threshold distance or standard deviation), additional particle filters may be utilized to generate the point cloud 802B.

In the third image 802C, the object 806A is seen to have moved to a next position. Again, as can be seen, the system determines, based on the proximity of the first object 806A in the third image 802C to the predictions of the point cloud 820B, that the first object 806A in the third image 806C is the same as the first object 806A from the second image 802B. Additionally or alternatively, the system may make its determination based on a velocity (e.g., speed and/or direction) of the first object 806A, as determined by a previous change in position of the first object 806A from the point in time represented by the first image 802A to the point in time represented by the second image 802B.

Consequently, the trajectory 822 may be updated to include the path traveled by the first object 806A from the point in time represented by the second image 802B to the point in time represented by the third image. The point cloud 820C may then be generated by at least inputting the new position of the first object 806A in the third image 802C. Likewise, in some implementations, the one or more particle filters may receive as input a previous position of the first object 806A (e.g., one or both of the positions in the second image 802B or 802A) and/or which of the particular particle filters appeared to most accurately predict the position of the first object 806A in the first image 802C. In some implementations, the particle filters may be again adjusted in the manner described above.

In some situations, due to any of a variety of factors (e.g., inclement weather, reduced image quality, obscured visibility, an object being blocked by another object, etc.) the system of the present disclosure may be unable to detect the object 806A within a particular image frame. In such cases, the particle filter inputs may include such data and the point cloud (e.g., the point cloud 820C may) expand to cover more area to account for additional distance the first object 806A may have moved between frames. Upon redetection of the first object 806A in a subsequent frame, the trajectory 822 may be extended to the position at which the first object 806A is located in the subsequent frame. In a case where the system cannot establish the identity of the first object 806A as being the same as the first object 806 detected in a previous frame above a threshold certainty value, the system may begin a new trajectory for the first object 806A. The new trajectory and the old trajectory may be stitched (e.g., the set of coordinates of the new trajectory appended to the set of coordinates of the old trajectory) together from input from a user after a manual examination of the two trajectories.

In an embodiment, the trajectory 822 represents a path taken by the first object 806A over the time period of the sequence of images 802A-02C. The trajectory 822 may be stored as a series of points (i.e., positions) or vectors. The points of the trajectory 822 may be locations in physical space, three-dimensional virtual space, coordinates in a two-dimensional space (e.g., aerial view of the scene represented by the images (802A-02C), pixel coordinates in an image, or some other unit for designating the position of a point. A line connecting each point in sequence may be considered to be the path traveled by the object corresponding to the trajectory 822, which, in example 800, would be the first object 806A. The process described above may continue for as many images as are in the sequence of images.

FIG. 9 is a flowchart illustrating an example of a process 900 for simulating the impact of a command in accordance with various embodiments. Some or all of the process 900 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 900 may be performed by any suitable system, such as a server in a data center, by various components of the environment 1300 described in conjunction with FIG. 13, such as the one or more web servers 1306 or the one or more application servers 1308, by multiple computing devices in a distributed system of a computing resource service provider, or by any electronic client device such as the electronic client device 1302. The process 900 includes a series of operations wherein an object is identified in each successive image frame in a sequence of images and a trajectory of the object is tracked frame-by-frame.

In 902, the system performing the process 900 obtains a sequence of images. The sequence of images may be a series of image frames comprising a video capture event and may have been recorded/captured by a single image capture device (e.g., video camera). Within one or more images in the sequence of images may be a digital representation (e.g., set of pixels) of an object within the scene of the image. The object may be similar to one of the objects 106 of FIG. 1. For example, the object may be an animate object in motion that is captured in the sequence of images.

Proceeding from 902 to 904, system performing the process 900 locates the object whose trajectory is to be tracked within the first image of the sequence. It may be that the first image contains a plurality of objects within the image and, for each of the objects detected within the first image, the operations of 904-922 may be repeated in series or in parallel. The system may identify the object within the image using any of a variety of object detection methods as described in the present disclosure.

In the case where the system returns to 904 from 912, the system may locate the object in the next image in the sequence. This may be performed by locating one or more objects in the image and determining which of the one or more objects are within a set of predicted locations, and if one or more objects are not within the set of predicted locations, which of the one or more objects is closest to the set of predicted locations; in a situation where multiple objects are within the set of predicted locations (or in the case of a tie to being the closest to the set of predicted locations) the system may identify which object to consider as the object based at least in part on various factors (e.g., average distance to each of the predicted locations in the set, etc.). In some implementations, the system may only consider objects that are found within a certain distance of the last identified location of the object. In some of these implementations, the system may increase the certain distance based on the number of frames since the object was last identified (e.g., if the object has not been detected for a number of frames, expand the search area). Upon identifying the object, the system determines the position of the object in a coordinate system. In some implementations, the position of the object in a coordinate system is the two-dimensional coordinates of a pixel position in the image. In some implementations, the coordinate system may be represented in real-world units (e.g., centimeters, feet, etc.) and may be two-dimensional (X-Y) or three-dimensional (X-Y-Z).

For the first image in the sequence, the operations of 906 may be omitted. However, in 906, the system determines whether it has identified the object in the image being examined. It may be that, due to various factors, the system was unable to identify the object within a degree of certainty (e.g., a view of the object in the image is obscured, multiple objects within the vicinity of the predictions having a probability above a threshold (e.g., above 25%) of corresponding to the object, so out of caution, no object is selected). If the object is identified, the system proceeds to 918.

Otherwise, the system proceeds to 908, where the system performing the process 900 determines whether the set of predicted locations exist. If not (e.g., in the case where the image is the first image in the sequence), the system may initialize the set of predicted locations. As noted in the present disclosure, the set of predicted locations may be results returned from executing a set of particle filters (also referred to as a "prediction model"). The set of particle filters may be an ensemble of Kalman filters that applies physical laws of motions to multiple sequential measurements (e.g., previous positions of the object) to return an estimate of a future position of the object. Thus, if the set of predicted locations by the set of particle filters exist, the system may proceed to 914. Otherwise, the system may proceed to 910 to initialize the set of predictions.

In 910, the system initializes the set of particle filters (also known as the prediction model). In embodiments, the set of particle filters may be initialized by seeding the set of particle filters with the current position of the object and a Gaussian distribution of positions in the vicinity of the current position of the object. Using the set of particle filters, in 912, the system performing the process 900 generates a set of predicted locations for the object in the next image. Thereafter, the system returns to 904 to use the set of predicted locations to identify the object in the next image.

Proceeding to 916, if the object determined to have been found in 906, the system performing the process 900 adds the current position of the object to a set of past object positions that comprise a trajectory of the object. The trajectory may be a series of coordinates that define a path taken by the object over the time period during which the sequence of images were captured.

In some implementations, further after determining in 906 that the object was found, the system may determine which of the set of predicted locations was the best fit to the actual object position. The system may adjust the prediction model based on the predicted location that was found to be the most accurate (e.g., closest to the actual position), and in this manner, may self-tune itself to make more accurate predictions over time.

In 918, the system performing the process 900 updates the prediction model. In some embodiments, updating the prediction model includes adding the current position of the object as input to the set of particle filters. In some implementations, updating the prediction model includes adding or removing particle filters from the set of particle filters. Furthermore, in some implementations, updating the prediction model may include expanding the area of the point cloud (i.e., distribution of the set of particle filters), such as in the case where the system was unable to determine that the object was found within the current image in 906.

In 920, the system performing the process 900 determines whether it has reached the last image in the sequence of images. If not, the system proceeds to 912 to generate a new set of predicted locations for the object in the next image based at least in part on the updated prediction model of 918. Otherwise, the system proceeds to 922, whereupon the system outputs the trajectory. In some cases, the system may output the trajectory to a storage destination, such as a data store, for later use or analysis. In other cases, the system may output the trajectory to be processed further, such as by matching trajectories in sequences of images captured by multiple image capture devices, such as in the manner described in FIG. 10.

Note that one or more of the operations performed in 902-22 may be performed in various orders and combinations, including in parallel. Furthermore, the operations in 904-22 may be repeated in parallel or in series for each of multiple objects that the system performing the process 900 is able to detect within the images.

FIG. 10 illustrates an example 1000 of an embodiment of the present disclosure. Specifically, FIG. 10 depicts a mapping trajectories 1022A-22B of objects 1006A-06B in a first sequence of images 1002A captured by a first image capture device to trajectories 1022C-22D of objects 1006C-06D in a second sequence of images 1002A captured by a second image capture device, and, in turn to trajectories 1022E-22G of objects 1006E-06G in a third sequence of images 1002C captured by a third image capture device. Note that the techniques described in connection with FIG. 10 may be applied to sequences of images captured by two image capture device up to any number of image capture devices.

In an embodiment, each of the sequences of images 1002A-02C are similar to the sequence of images 802A-02C of FIG. 8, the first sequence of images 1002A was captured by a first camera, the second sequence of images 1002B was captured by a second camera, and the third sequence of images 1002C was captured by a third camera. The sequences of images 1002A-02C may be recordings of the same scene due to overlap in field of views of the respective recording devices, similar to the situations depicted in FIGS. 1-3. As a result, the sequences of images 1002A-02C may include digital representations of one or more objects in the same scene common to some or all of the image capture devices.

In an embodiment, the objects 1006A-06G are digital representations (e.g., sets of pixels) of physical objects recorded within the images of the sequences of images 1002A-02C by three image capture devices. In an embodiment, the trajectories 1022A-22G are sets of points (e.g., coordinates) that represent the path of motion followed by the physical objects represented by the objects 1006A-06G during the event captured in the sequences of images 1002A-02C.

In the example 1000, three video cameras have simultaneously captured sequences of images. In the example 1000, it is determined from the multi-camera homogenous object alignment process of FIGS. 6-7 that objects 1006A-06B (A and B) in the first sequence of images 1002A correspond to objects 1006D and 1006D (Y and X respectively) in the second sequence of images 1002B and objects 1006E-06F (M and N respectively) in the third sequence of images 1002C. Consequently, the system of the present disclosure can determine that the trajectories 1022A, 1022D, and 1022F, as determined as a result of the process of FIG. 9 correspond to the same trajectory, but from different perspectives. Similarly the system may determine that the trajectories 1022B, 1022C, and 1022E also correspond to another same trajectory, but from different perspectives.

Matrices for the trajectories of the objects 1006A-06F may be expressed in the following manner for a first set of image frames (e.g., frame$_\alpha$ to frame$_{\alpha+5}$) of each of the sequences of images 1002A-02C:

[A Y M]

[B X N]

However, as can be seen in the example 1000, something happens with the third sequence of images 1002C such that the system loses track of the object 1006F (M). However, through continued processing of the sequences of images via the processes of FIGS. 6-7 and 9, the system determines a trajectory 1022G for a different object 1006G and further determines that the objects 1006A and 1006C correspond with the different object 1006G. This further provides evidence to the system that the trajectory 1022G corresponds to parts of the trajectories 1022A and 1022C because they spatially and temporally align in the manner described above. Consequently, matrices for the trajectories of the object 1006-06E and 1006G may be expressed in the following manner for a second set of image frames (e.g., frame$_{\propto+10}$+10 to frame$_{\propto+15}$) of each of the sequences of images 1002A-02C:

$$[A\ Y\ O]$$

$$[B\ X\ N]$$

Thus, a first physical object represented by the objects 1006A, 1006D, and 1006F-06G over the sequences of images 1002A-02C may be represented as the set of trajectories [A][Y][M][O]. Likewise, a second physical object represented by the objects 1006B-06C, and 1006E over the sequences of images 1002A-02C may be represented as the trajectories[B][X][N]. In some implementations, the trajectories may be stitched together, such that the matrix for the first physical object becomes:

$$[A\ Y\ M \cup O]$$

In some cases, a trajectory may begin within the sequence of images. For example, an object that initially began outside the field of view of the image capture device may move into the field of view of the image capture device. In such a case, the trajectory may begin at the point that the object is first detected. In a similar manner, a trajectory may end before the end of the sequence of images, such as if an object that had been within the field of view of the image capture device moves outside the field of view of the image capture device. In cases where multiple image capture devices capture the same scene, one image capture device may have the object within its field of view while the other image capture device lacks the object from its field of view. In such cases, a trajectory in the sequence of images of the first image capture device may have no corresponding trajectory within the second image capture device.

Conversely, trajectories may be split. Splitting a trajectory may be used to rectify a situation where multiple objects cross paths and the system of the present disclosure inadvertently attributes motion of at least one object to the incorrect trajectory. This situation is illustrated in FIG. 11.

Figure 11:
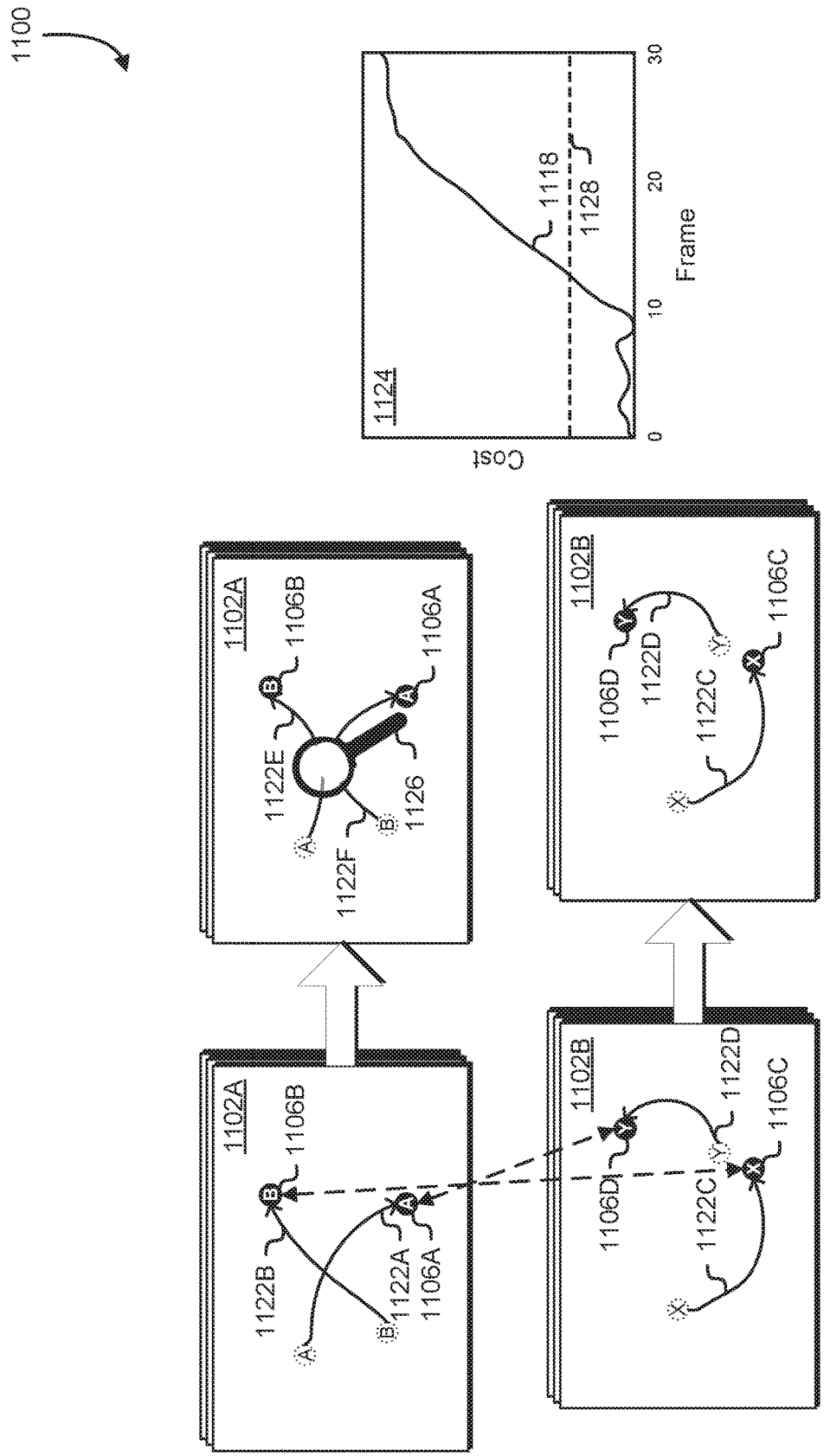
FIG. 11 illustrates an example of detecting misattributed trajectories in accordance with an embodiment.

FIG. 11 illustrates an example 1100 of a misattributed trajectory of an embodiment of the present disclosure. Specifically, FIG. 11 depicts sequences of images 1102A-02B of an event recorded by image capture devices. In the actual event, the paths of the objects 1106A-06B from the view of a first image capture device cross, as can be seen illustrated by the paths 1122A-22B. However, in some cases the system performing the process 900 of FIG. 9 may initially misattribute at least a part of the trajectory of the first object 1106A to the second object 1106B and vice versa. This misattribution may be caused by the objects 1106A-06B being in such close proximity to each other for at least one frame that one of the objects 1106A-06B obscures the other or is otherwise within the point cloud of the other object, and gets mistakenly attributed to the other object's trajectory thereby. An example of a stage where such a misattribution could occur is illustrated by the magnifying glass.

In an embodiment, the first sequence of images 1102A is a set of image frames captured by a first image capture device, such as the sequence of images 1002A of FIG. 10. Likewise the second sequence of images 1102B is a set of image frames capture by a second image capture device, such as the sequence of images 1002B. In an embodiment, the objects 1106A-06D are digital representations (e.g., sets of pixels) of objects in the physical world recorded to the sequences of images 1102A-02B during the event captured by the image capture devices. In an embodiment, the actual trajectories 1122A-22D are the paths of motion actually taken by the respective objects 1106A-06D, such that each point of the trajectories 1122A-22D correspond to a position occupied by their respective objects 1106A-06D.

The mis-assigned trajectories 1122E-22F show how the system performing the process 900 of FIG. 9 has inadvertently mis-assigned portions of the trajectories 1122A-22B. For example, a portion of the actual trajectory 1122A of the first object 1106B has been misattributed to the second object 1106A such that the trajectory 1122F begins at the beginning location of the first object 1106A and ends at ending location of the second object 1106B. Likewise, a portion of the actual trajectory 1122B of the second object 1106B has been assigned to the first object 1106A such that the trajectory 1122F begins at the beginning location of the second object 1106B and ends at the ending location of the first object 1122A.

The cost 1118 reflects the effect that a mis-assigned trajectory has on a cost value of associating a point in the trajectory of an object in one camera with the analogous point in the mis-assigned trajectory over time (e.g., deeper into the sequence of image frames). It can be seen in the cost graph 1124 that the cost 1118 appears to indicate that the mis-assignment of the trajectories 1122E-22F began somewhere between frame 10 and frame 15. The particular cost threshold 1128 may be specified value above which the trajectory associated with the cost 1118 is determined to be mis-assigned. The image frame at which the trajectory is determined to be mis-assigned may be the frame at which the mis-assigned trajectory needs to be split.

The first object 1106A and the first part of the mis-assigned trajectory 1122F are initially correctly attributed. However, by applying cost matrices to the corresponding points between the mis-assigned trajectory 1122E and the trajectory 1122D, it can be seen in the cost graph 1124 that the cost 1128 of associating the first object 1106A with the trajectory 1122F rises sharply as the trajectory 1122E diverges. Thus, in some implementations, if the cost 118 is observed by the system of the present disclosure to exceed a particular cost threshold 1128, the system determines that a trajectory mis-assignment has occurred.

In the example 900, it is illustrated that the first object 1106A represents the same object as the fourth object 1106D, but viewed from a different perspective. Likewise, it is illustrated that the second object 1106B is a representation of the same object represented by the third object 1106C, but also viewed from a different perspective. As illustrated in 1100, on an initial pass, the system determines that the mis-assigned trajectory 1122E corresponds to trajectory 1122D and the mis-assigned trajectory 1122F corresponds to the trajectory 1122C.

To check the accuracy of the determination, the system applies a homography constraint to the trajectories. For example, for an image frame in the first sequence of images 1102A, the system computes an epipolar line in the corresponding image frame in the second sequence of images 1102B, with the epipolar line being based on the point in the trajectory 1122E that corresponds to that image frame in the first sequence of images 1102A. The system calculates a first distance (e.g., in pixels) of the point in the trajectory 1122D that corresponds to that image frame in the second sequence of images 1102B to the epipolar line.

Likewise, for an image frame in the second sequence of images 1102B, the system computes an epipolar line in the corresponding image frame in the first sequence of images 1102A, with the epipolar line being based on the point in the trajectory 1122D that corresponds to that image frame in the second sequence of images 1102B. The system calculates a second distance of the point in the trajectory 1122E that corresponds to that image frame in the first sequence of images 1102A to the epipolar line. In some implementations, the cost is a sum of the first distance and the second distance.

In some implementations, the system also measures the distance of points in other objects' trajectories (e.g., the trajectories 1122F and 1122C) to the epipolar lines in order to generate a pair of cost matrices as described above in conjunction with FIG. 3. In such implementations, an optimization algorithm, such as the Hungarian algorithm, may be applied to determine a lowest cost assignment of trajectory points. This process may be repeated for at least a portion of the images in the sequences of images 1102A-02B. If the lowest cost assignment of trajectory points diverges at all—or diverges by a threshold amount—the system may split the mis-assigned trajectories and stitch (append) the trajectories according to the lowest cost assignment. Starting from the image frame corresponding to this split, the system may repeat the process 900 for the sequence of image frames (e.g., the sequence of image frames 1102A) to regenerate the trajectories from this point. In this manner, the portions of the mis-assigned trajectories 1122C-22D are split off and re-attached to the correct trajectories such that they match the actual trajectories 1122A-22B.

In some implementations, the system of the present disclosure may be trained to recognize the causes of erroneous trajectories and perform mitigation operations. For example, the system may be trained to identify characteristics of occluded visibility, lens flares, reflections, or ghost images and may discard such anomalies when identifying objects within or proximate to the point cloud. As another example, in a case where corresponding trajectories in both a first sequence of images captured by a first image capture device and in a second sequence of images capture device are mis-aligned, the system may, by determining which of the trajectories to split and stitch for the first sequence of images, make a more accurate determination of which of the trajectories in the second sequence of images to split and stitch. In some implementations, one or more of various machine learning techniques may be implemented to improve accuracy in trajectory determination, such as supervised learning techniques, unsupervised learning techniques, semi-supervised learning techniques, transduction or transductive inference techniques, reinforcement learning, developmental learning, and the like.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

Figure 12:
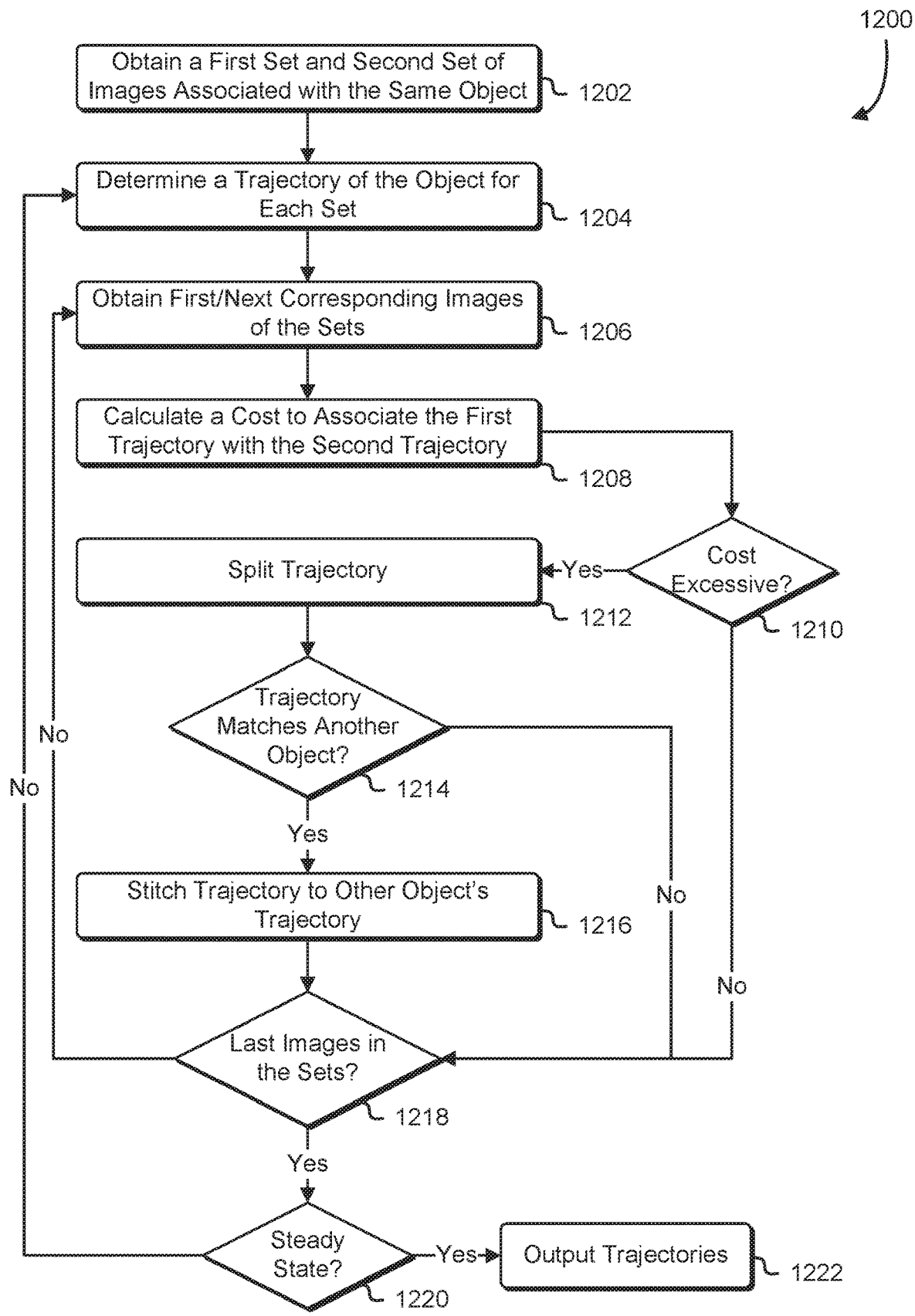
FIG. 12 is a flowchart that illustrates an example of validating trajectories in accordance with an embodiment.

FIG. 12 is a flowchart illustrating an example of a process 1200 for validating trajectories in accordance with various embodiments. Some or all of the process 1200 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1200 may be performed by any suitable system, such as a server in a data center, by various components of the environment 1300 described in conjunction with FIG. 13, such as the one or more web servers 1306 or the one or more application servers 1308, by multiple computing devices in a distributed system of a computing resource service provider, or by any electronic client device such as the electronic client device 1302. The process 1200 includes a series of operations wherein trajectories are determined for identified objects in sets of images captured by at image capture devices, costs of assigning a trajectory in one set of images to a trajectory in another of the set of images are calculated, and if the cost indicates that a trajectory has been mis-assigned split the trajectory and rejoin the trajectory to a trajectory that is a better fit. These operations may be repeated until the trajectories achieve a steady state, at which point the trajectories are validated and may be output.

In 1202, the system performing the process 1200 obtains a first set of images captured by a first image capture device and a second set of images captured by a second image capture device. The sets of images may be sequences of images (e.g., digital video) of the same scene but from different positions and perspectives. Note that the techniques are described in terms of two sets of images, but it is contemplated that the process 1200 may be extended to more than two sets of images that share representations of the same object.

In 1204, the system performing the process 1200 determines for each of the sets of images, a trajectory of an object within the scene in the manner described in the process 900 of FIG. 9. That is, the system determines a trajectory for a representation of an object in the first set of images that is determined to correspond to a trajectory for a representation of the same object in the second set of images.

In 1206, the system performing the process 1200 obtains a first image that is associated with a point in a first trajectory from the first set of images and a corresponding second image that is associated with a point in a second trajectory from the second set of images, where the first trajectory and the second trajectory were, at least initially, determined to correspond to the same object (e.g., by using an epipolar and/or homography constraint as descried in conjunction with FIGS. 2-7).

In 1208, the system performing the process 1200 calculates the cost to associate the first trajectory with the second trajectory. The cost may be calculated in a variety of ways. For example, in an implementation the cost is the sum of the distance of the point in the first trajectory to an epipolar line in the first image that corresponds to point in the second trajectory in the second image and the distance of the point in the second trajectory to an epipolar line in the second image that corresponds to the point in the first trajectory. Further details on these calculations may be found in the description of FIGS. 2-3. In another implementation, the system builds cost matrices based epipolar lines and points in all of the trajectories in the first and second images and a combinatorial optimization algorithm is used to determine lowest-cost assignment.

In 1210, the system performing the process 1200 determines whether the cost calculated in 1208 indicates that the trajectories at the points represented in the first image and the second image are unlikely to be correctly matched. For example, in an implementation if the calculated cost exceeds a threshold value, the system determines that the trajectories are not, or are no longer, correctly matched. As another example, in another implementation if, based on results from a combinatorial optimization algorithm, the lowest-cost assignment does not match the first trajectory with the second trajectory, the system determines that the trajectories are not, or are no longer, correctly matched. As a result of determining that the first trajectory is an incorrect match to the second trajectory, the system proceeds to 1212. Otherwise, the system may proceed to 1218.

In 1212, the system performing the process 1200, having determined that the first trajectory is an incorrect match to the second trajectory, splits the trajectories. That is, the system may conclude the portions of the first and second trajectories assigned to a first object at the points represented by the previous image frames in the first and second sets of images. However, it may not be clear at this stage which of either the first trajectory or the second trajectory is mis-assigned. Thus, in some implementations the system may perform operations similar to the epipolar and/or homography constraints described conjunctions with in FIGS. 2-7; that is, the system may generate cost matrices using distances to epipolar lines from points in the trajectories of the first and second images and a combinatorial optimization algorithm to determine whether either the first trajectory or second trajectory should be assigned, at this point in the trajectory, to a different object.

In 1214, the system performing the process 1200 determines, whether the cost assignment performed in 1212 indicates that the first trajectory and/or second trajectory at the point associated with the first image and the second image should be associated with a different object. If not, the system may proceed to 1218. Otherwise, the system proceeds to 1216.

In 1216, the system performing the process 1200, having determined that the first trajectory and/or second trajectory should be associated with a different object, appends (stitches) the remaining portion of the mis-assigned trajectory to the trajectory of the different object. In some cases, if the different object is already associated with its own trajectory, the system may append/stitch the remaining portions of that trajectory to the object previously associated with the mis-assigned trajectory.

In 1218, the system performing the process 1200 determines whether the end of the first and second sets of images has been reached. If all images in the first and second sets of images have not been processed, the system may return to 1206 to obtain the next images in the sets. Otherwise, if all of the images have been processed, the system proceeds to 1220.

In 1220, the system performing the process 1200 determines whether all trajectories computed in the process 1200 have achieved a steady state. In some examples, a "steady state" is achieved when no further trajectories are determined to be mis-assigned after a specified number of iterations (e.g., one, iteration, two iterations, three iterations, etc.) of the operations 1204-18 (e.g., no further trajectory splits are performed). If, however, one or more trajectories were determined to be mis-assigned during the most recent performance of the operations of 1204-18, the system may return to 1204 to repeat the trajectory validation process. Otherwise, the system proceeds to 1222 to output the trajectories that have been validated as properly assigned. Note that one or more of the operations performed in 1202-22 may be performed in various orders and combinations, including in parallel.

Once trajectories have been determined and objects have been identified, the system of the present disclosure may be able to locate the position of any object in the sequences of images at any specified time or image frame. For example, through an interface a user may submit a request to the system of the present disclosure for the state (e.g., coordinates and/or velocity) of a particular object in the $10^{th}$ frame of videos of the same scene recorded by three cameras. Additionally or alternatively, the system of the present disclosure may cause a display screen (e.g., by sending signals or image data to the display screen) to highlight or otherwise mark the object in a depiction of the image frame on the screen. In this manner, a user may view and track an object's motion in any or all camera views of the scene(s) containing the object image. The object's motion, trajectory, and or position may be displayed in an image, multiple images side-by-side, or as moving visual media playing the sequences of images at any of a variety of speeds (e.g., fast, slow, step, etc.). In some examples, an "interface" refers to computer hardware or software designed to communicate information between hardware devices, between software programs, between devices and programs, or between a device and a user.

The techniques described herein may be used to analyze the motion and impact of objects before a crash, explosions, trajectories of shrapnel, ballistics and the manner in which motion and velocity of various compositions of matter is affected by impact and ricochet, and other kinematics studies. Note, that techniques of the present disclosure may be applied to distinguish objects and track trajectories of various objects in motion that are captured within a sequence of image frames, whether the objects are moving at high speeds (e.g., automobiles, projectiles, objects in space, etc.), at low speeds (e.g., bacteria, plant growth, etc.), or at speeds in-between (e.g., sports players, herd animals, migratory birds, etc.).

FIG. 13 illustrates aspects of an example environment 1300 for implementing aspects in accordance with various embodiments. As will be appreciated, although a web-based environment is used for purposes of explanation, different environments may be used, as appropriate, to implement various embodiments. The environment includes an electronic client device 1302, which can include any appropriate device operable to send and/or receive requests, messages, or information over an appropriate network 1304 and convey information back to a user of the device. Examples of such client devices include personal computers, cell phones, handheld messaging devices, laptop computers, tablet computers, set-top boxes, personal data assistants, embedded computer systems, electronic book readers, and the like.

The environment 1300 in one embodiment is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than those illustrated in FIG. 13.

Thus, the depiction in FIG. 13 should be taken as being illustrative in nature and not limiting to the scope of the disclosure.

The network 1304 can include any appropriate network, including an intranet, the Internet, a cellular network, a local area network, a satellite network or any other network, and/or combination thereof. Components used for such a system can depend at least in part upon the type of network and/or environment selected. Many protocols and components for communicating via such network 1304 are well known and will not be discussed in detail. Communication over the network 1304 can be enabled by wired or wireless connections and combinations thereof. In an embodiment, the network 1304 includes the Internet and/or other publicly-addressable communications network, as the environment 1300 includes one or more web servers 1306 for receiving requests and serving content in response thereto, although for other networks an alternative device serving a similar purpose could be used as would be apparent to one of ordinary skill in the art.

The illustrative environment 1300 includes one or more application servers 1308 and data storage 1310. It should be understood that there can be several application servers, layers or other elements, processes or components, which may be chained or otherwise configured and can interact to perform tasks such as obtaining data from an appropriate data store. Servers, as used, may be implemented in various ways, such as hardware devices or virtual computer systems. In some contexts, "servers" may refer to a programming module being executed on a computer system. As used, unless otherwise stated or clear from context, the term "data store" or "data storage" refers to any device or combination of devices capable of storing, accessing, and retrieving data, which may include any combination and number of data servers, databases, data storage devices, and data storage media, in any standard, distributed, virtual, or clustered environment.

The one or more application servers 1308 can include any appropriate hardware, software, and firmware for integrating with the data storage 1310 as needed to execute aspects of one or more applications for the electronic client device 1302, handling some or all of the data access and business logic for an application. The one or more application servers 1308 may provide access control services in cooperation with the data storage 1310 and is able to generate content including text, graphics, audio, video, and/or other content usable to be provided to the user, which may be served to the user by the one or more web servers 1306 in the form of HyperText Markup Language (HTML), Extensible Markup Language (XML), JavaScript, Cascading Style Sheets (CSS), JavaScript Object Notation (JSON), and/or another appropriate client-side structured language. Content transferred to the electronic client device 1302 may be processed by the electronic client device 1302 to provide the content in one or more forms, including forms that are perceptible to the user audibly, visually, and/or through other senses. The handling of all requests and responses, as well as the delivery of content between the electronic client device 1302 and the one or more application servers 1308, can be handled by the one or more web servers 1306 using Hypertext Preprocessor (PHP), Python, Ruby, Perl, Java, HTML, XML, JSON, and/or another appropriate server-side structured language in this example. Further, operations described as being performed by a single device may, unless otherwise clear from context, be performed collectively by multiple devices, which may form a distributed and/or virtual system.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The data storage 1310 can include several separate data tables, databases, data documents, dynamic data storage schemes, and/or other data storage mechanisms and media for storing data relating to a particular aspect of the present disclosure. For example, the data storage 1310 may include mechanisms for storing various types of data and user information 1316, which can be used to serve content to the electronic client device 1302. The data storage 1310 also is shown to include a mechanism for storing log data, such as application logs, system logs, access logs, and/or various other event logs, which can be used for reporting, analysis, or other purposes. It should be understood that there can be many other aspects that may need to be stored in the data storage 1310, such as page image information and access rights information, which can be stored in any of the above listed mechanisms as appropriate or in additional mechanisms in the data storage 1310. The data storage 1310 is operable, through logic associated therewith, to receive instructions from the one or more application servers 1308 and obtain, update, or otherwise process data in response thereto. The one or more application servers 1308 may provide static, dynamic, or a combination of static and dynamic data in response to the received instructions. Dynamic data, such as data used in web logs (blogs), shopping applications, news services, and other applications may be generated by server-side structured languages as described or may be provided by a content management system (CMS) operating on, or under the control of, the one or more application servers 1308.

In one embodiment, a user, through a device operated by the user, can submit a search request for a match to a particular search term. In this embodiment, the data storage 1310 might access the user information to verify the identity of the user and obtain information about items of that type. The information then can be returned to the user, such as in a results listing on a web page that the user is able to view via a browser on the electronic client device 1302. Information related to the particular search term can be viewed in a dedicated page or window of the browser. It should be noted, however, that embodiments of the present disclosure are not necessarily limited to the context of web pages, but may be more generally applicable to processing requests in general, where the requests are not necessarily requests for content.

The various embodiments further can be implemented in a wide variety of operating environments, which in some embodiments can include one or more user computers, computing devices, or processing devices that can be used to operate a number of applications. User or client devices can include any number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thinclients, gaming systems, and other devices capable of communicating via the network 1304. These devices also can include virtual devices such as virtual machines, hypervisors, and other virtual devices capable of communicating via the network 1304.

Various embodiments of the present disclosure utilize the network 1304 that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), and Common Internet File System (CIFS). The network 1304 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering.

In embodiments utilizing the one or more web servers 1306, the one or more web servers 1306 can run any of a variety of server or mid-tier applications, including Hypertext Transfer Protocol (HTTP) servers, FTP servers, Common Gateway Interface (CGI) servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python, or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment 1300 can include a variety of data stores and other memory and storage media as discussed above. These can reside in a variety of locations, such as on a storage medium local to (and/or resident in) one or more of the computers or remote from any or all of the computers across the network 1304. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, a central processing unit (CPU or processor), an input device (e.g., a mouse, keyboard, controller, touch screen, or keypad), and an output device (e.g., a display device, printer, or speaker). Such a system may also include one or more storage devices, such as disk drives, optical storage devices, and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium representing remote, local, fixed, and/or removable storage devices as well as storage media for temporarily and/or more permanently containing, storing, transmitting, and retrieving computer-readable information. The system and various devices will typically also include a number of software applications, modules, services, or other elements located within a working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as volatile and non-volatile, removable and non-removable media implemented in any method, or technology for storage and/or transmission of information such as computer readable instructions, data structures, program modules, or other data, including RAM, ROM, Electrically Erasable Programmable Read-Only Memory (EEPROM), flash memory or other memory technology, Compact Disc Read-Only Memory (CD-ROM), digital versatile disk (DVD), or other optical storage, magnetic cassettes, magnetic tape, magnetic disk storage, or other magnetic storage devices, or any other medium which can be used to store the desired information and can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc. may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising instructions executable by one or more processors. The computer-readable storage medium may be non-transitory. In some embodiments, the code is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some embodiments, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some embodiments, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may in some embodiments be single devices and in other embodiments be distributed computer systems comprising multiple devices that operate differently such that the distributed computer system performs the operations described and such that a single device may not perform all operations.

The use of any examples, or exemplary language (e.g., "such as") provided is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents cited are hereby incorporated by reference to the same extent as if each reference were individually and specifically indicated to be incorporated by reference and were set forth in its entirety.

What is claimed is:

1. A computer-implemented method, comprising:
   obtaining, via a plurality of image capture devices sharing different perspective views of a common scene, a first image and a second image;
   determining a first point corresponding to an object identified in the first image;
   determining, based at least in part on the first point and relative positions of the plurality of image capture devices, a line in the second image corresponding to the first point in the first image;
   determining, in the second image, a second point corresponding to a first set of pixels and a third point corresponding to a second set of pixels;

determining a first distance from the second point to the line and a second distance from the third point to the line;

calculating, based at least in part on the first distance and the second distance, a set of cost values;

determining, based at least in part on the set of cost values, that the first set of pixels represents, in the second image, the object identified in the first image; and associating the first set of pixels with the object.

2. The computer-implemented method of claim 1, wherein determining that the first set of pixels represents the object includes applying a combinatorial optimization algorithm to the set of cost values.

3. The computer-implemented method of claim 1, wherein:

the method further comprises:

transforming, based at least in part on the different perspective views, the first set of pixels and the second set of pixels into transformed sets of pixels; and modifying, based at least in part on the transformed sets of pixels, the set of cost values to produce modified cost values; and determining that the first set of pixels represents the object in the second image is performed based at least in part on the modified cost values.

4. The computer-implemented method of claim 1, further comprising;

calculating, based at least in part on positions of the plurality of image capture devices in a physical space, an expected position of the object in the physical space; and modifying the set of cost values based at least in part on the expected position.

5. A system, comprising:

one or more processors; and memory including executable instructions that, if executed by the one or more processors, cause the system to:

identify, based at least in part on specified criteria, a first digital representation in an image and a second digital representation in a second image;

determine, based at least in part on a position of the first digital representation in the image, a first epipolar line in the second image;

determine, based at least in part on a position of the second digital representation in the second image, a second epipolar line, the second epipolar line being in the image;

determine at least one cost value based at least in part on:

the first digital representation;
the second digital representation;
the first epipolar line; and
the second epipolar line;

determine, based at least in part on the at least one cost value, that the first digital representation and the second digital representation represent a same object; and associate, in a data store, the first digital representation with the second digital representation.

6. The system of claim 5, wherein:

the executable instructions further include instructions that cause the system to determine transformations of the first digital representation and the second digital representation as a result of transforming:

a first region of pixels within the image to fit a particular shape; and a second region of pixels in the second image to fit the particular shape; and the executable instructions that cause the system to determine the at least one cost value further cause the system to determine the at least one cost value based at least in part on sizes of the transformations.

7. The system of claim 5, wherein the specified criteria includes a characteristic usable to identify the first digital representation in the image, the characteristic being a size of a set of pixels, a shape of the set of pixels, or a color of the set of pixels.

8. The system of claim 5, wherein the first digital representation is one of a plurality of digital representations in the image, wherein each of the plurality of digital representations matches the specified criteria.

9. The system of claim 8, wherein:

a plurality of cost values is associated with the plurality of digital representations, the plurality of cost values including the at least one cost value; and the executable instructions that cause the system to determine that the first digital representation and the second digital representation represent the same object include instructions that cause the system to perform an optimization algorithm to the plurality of cost values to determine that the first digital representation and the second digital representation represent the same object.

10. The system of claim 9, wherein the optimization algorithm is the Hungarian algorithm.

11. The system of claim 5, wherein the executable instructions that cause the system to determine the at least one cost value include include instructions that cause the system to:

determine a first pixel distance from the first digital representation to the first epipolar line;

determine a second pixel distance from the second digital representation to the second epipolar line; and determine the at least one cost value based at least in part on the first pixel distance and the second pixel distance.

12. The system of claim 5, wherein:

the image depicts a scene from a first perspective; and the second image depicts the scene from a second perspective different from the first perspective.

13. A non-transitory computer-readable storage medium having stored thereon executable instructions that, if executed by one or more processors of a computer system, cause the computer system to at least:

obtain a first image and a second image;

determine a first point corresponding to an object in the first image;

determine, based at least in part on the first point, a line in the second image;

determine a second point corresponding to a set of pixels in the second image;

calculate, based at least in part on a distance from the second point to the line, a cost of associating the set of pixels in the second image with the object in the first image; and determine, based at least in part on the cost, that the set of pixels represents the object.

14. The non-transitory computer-readable storage medium of claim 13, wherein the executable instructions further include instructions that cause the computer system to:

perform a transformation to the second image that produces a second set of pixels that are associated with the set of pixels; and modify the cost based at least in part on a size of the second set of pixels.

15. The non-transitory computer-readable storage medium of claim 13, wherein:
the cost is a first cost;
the executable instructions further include instructions that cause the computer system to:
determine, based at least in part on the second point, a second line in the first image; and
calculate, based at least in part on a distance from the first point to the second line, a second cost of associating the object in the first image with the set of pixels in the second image; and
the executable instructions that cause the computer system to determine that the set of pixels represents the object further include instructions that cause the computer system to determine, based at least in part on the first cost and the second cost, that the set of pixels represents the object.

16. The non-transitory computer-readable storage medium of claim 13, wherein the line is an epipolar line.

17. The non-transitory computer-readable storage medium of claim 13, wherein:
the first image is an image of a scene captured by a first image capture device from a first perspective; and
the second image is another image of the scene captured by a second image capture device from a second perspective.

18. The non-transitory computer-readable storage medium of claim 17, wherein:
the executable instructions further cause the computer system to determine a correspondence between the first image capture device and the second image capture device based at least in part on a static feature represented in the first image and second image; and
the executable instructions that cause the computer system to determine the line include instructions that cause the computer system to determine the line based at least in part on the correspondence.

19. The non-transitory computer-readable storage medium of claim 13, wherein:
the set of pixels is a first set of pixels;
the cost is a first cost;
the executable instructions further include instructions that cause the computer system to:
determine a third point corresponding to a second set of pixels in the second image; and
calculate, based at least in part on a second distance from the third point to the line, a second cost of associating the second set of pixels with the object; and
the executable instructions that cause the computer system determine that the set of pixels represent the object include instructions that cause the computer system to determine, based at least in part on the first cost being lower than the second cost, that the first set of pixels represents the object.

20. The non-transitory computer-readable storage medium of claim 13, wherein:
the first image is a member of a first sequence of images;
the object is associated with a first trajectory within the first sequence of images;
the set of pixels is associated with a second trajectory in a second sequence of images that includes the second image; and
the executable instructions further include instructions that cause the computer system to, as a result of the set of pixels being determined to represent the object, associate the first trajectory with the second trajectory.

* * * * *